United States Patent
Phong et al.

(10) Patent No.: US 10,768,923 B2
(45) Date of Patent: Sep. 8, 2020

(54) RELEASE ORCHESTRATION FOR PERFORMING PRE RELEASE, VERSION SPECIFIC TESTING TO VALIDATE APPLICATION VERSIONS

(71) Applicant: salesforce.com, inc., San Francisco, CA (US)

(72) Inventors: Kiet Phong, Newcastle, WA (US); Sreeram Duvur, Fremont, CA (US); Matthew Gainsborough, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/261,504

(22) Filed: Jan. 29, 2019

(65) Prior Publication Data

US 2020/0241865 A1 Jul. 30, 2020

(51) Int. Cl.
  *G06F 9/44* (2018.01)
  *G06F 8/65* (2018.01)
  *H04L 29/08* (2006.01)

(52) U.S. Cl.
  CPC ............ *G06F 8/65* (2013.01); *H04L 67/02* (2013.01); *H04L 67/34* (2013.01)

(58) Field of Classification Search
  CPC .................................................... G06F 8/65
  USPC ........................................................ 717/171
  See application file for complete search history.

(56) References Cited

U.S. PATENT DOCUMENTS

| 6,502,102 B1 * | 12/2002 | Haswell | G06F 11/3664 |
| 6,701,514 B1 * | 3/2004 | Haswell | G06F 11/3664 |
| | | | 707/999.102 |
| 7,155,462 B1 * | 12/2006 | Singh | G06F 8/65 |
| | | | 717/170 |
| 7,730,478 B2 | 6/2010 | Weissman | |

(Continued)

OTHER PUBLICATIONS

Carleto D., "Docker Enterprise 3.0 Brings Docker Kubernetes Services, New Lifecycle Automation Tools, and More," InfoQ, retrieved from https://www.infoq.com/news/2019/07/docker-enterprise-3/, Jul. 29, 2019, 6 pages.

(Continued)

*Primary Examiner* — Evral E Bodden
(74) *Attorney, Agent, or Firm* — Nicholson De Vos Webster & Elliott, LLP

(57) ABSTRACT

Upon receiving instructions from a release orchestrator to validate a second application version prior to a transition to sending production traffic to the second application version instead of a first application version, a determination of an application version identifier for a second application version is performed. Tests are selected based on the application version identifier and version rules. The tests are performed by sending test traffic to the second application version via a routing engine while the routing engine routes production traffic to the first application version. Based on the responses to the test traffic, a determination that any failure rules for any of the tests that failed indicate that on a failure the transition should not occur is performed. Responsive to that determination, a communication to the release orchestrator that the second application version is not validated for production traffic and the transition should not occur is performed.

20 Claims, 12 Drawing Sheets

(56) References Cited

U.S. PATENT DOCUMENTS

| | | | |
|---|---|---|---|
| 8,793,691 | B2 | 7/2014 | Devadhar |
| 9,367,595 | B1 | 6/2016 | Malks et al. |
| 9,858,187 | B2 | 1/2018 | Sundaravaradan et al. |
| 9,984,002 | B2 | 5/2018 | Sundaravaradan et al. |
| 9,990,400 | B2 | 6/2018 | Sundaravaradan et al. |
| 10,013,501 | B2 | 7/2018 | Sundaravaradan et al. |
| 10,162,650 | B2 * | 12/2018 | Frank .................. G06F 16/173 |
| 10,218,813 | B2 | 2/2019 | Peschansky et al. |
| 10,303,576 | B1 | 5/2019 | Seymour et al. |
| 10,452,997 | B2 | 10/2019 | Yang et al. |
| 10,474,559 | B2 * | 11/2019 | Moorthi ............... G06F 11/368 |
| 10,491,664 | B2 | 11/2019 | Tan et al. |
| 2011/0264765 | A1 | 10/2011 | Devadhar |
| 2012/0330913 | A1 | 12/2012 | Devadhar |
| 2013/0311926 | A1 | 11/2013 | Keegan et al. |
| 2014/0075445 | A1 | 3/2014 | Wang et al. |
| 2014/0304246 | A1 | 10/2014 | Helmich et al. |
| 2015/0128105 | A1 | 5/2015 | Sethi et al. |
| 2015/0379579 | A1 | 12/2015 | Chiang et al. |
| 2016/0119244 | A1 | 4/2016 | Wang et al. |
| 2016/0134596 | A1 | 5/2016 | Kovacs et al. |
| 2016/0239011 | A1 | 8/2016 | Lo et al. |
| 2016/0316310 | A1 | 10/2016 | Ström et al. |
| 2017/0054797 | A1 | 2/2017 | Helmich et al. |
| 2017/0116130 | A1 | 4/2017 | Sundaravaradan et al. |
| 2017/0116135 | A1 | 4/2017 | Sundaravaradan et al. |
| 2017/0286614 | A1 | 10/2017 | Morris et al. |
| 2018/0146069 | A1 | 5/2018 | Du et al. |
| 2018/0210814 | A1 | 7/2018 | Mevorach et al. |
| 2019/0020665 | A1 | 1/2019 | Surcouf et al. |
| 2019/0058722 | A1 | 2/2019 | Levin et al. |
| 2019/0171443 | A1 | 6/2019 | Nagae |
| 2019/0289057 | A1 | 9/2019 | Chen et al. |
| 2020/0099610 | A1 | 3/2020 | Heron et al. |

OTHER PUBLICATIONS

Hamdani D., "Announcing Docker Enterprise 3.0: Delivering High-Velocity Application Innovation," Docker Blog, retrieved from https://blog.dockercom/2019/04/announcing-docker-enterprise-3-0/, Apr. 30, 2019, 5 pages.

Helgevold T., "Deploying Kubernetes with Zero Downtime," retrieved from https://www.syntaxsuccess.com/viewarticle/deploying-kubernetes-with-zero-downtime, Aug. 3, 2019, 6 pages.

Pilon A., "Docker Enterprise 3.0 Introduces New Tools for Container-Based Applications," TechGenix, retrieved from techgenix.com/docker-enterprise-3/, May 20, 2019, 6 pages.

Amaral, et al., "Performance Evaluation of Microservices Architectures using Containers", [Online], pp. 27-34, [Retrieved from Internet on Mar. 28, 2020], (Year: 2015).

Non-Final Office Action for U.S. Appl. No. 16/261,501, dated Apr. 3, 2020, 23 pages.

Notice of Allowance for U.S. Appl. No. 16/261,495, dated Apr. 3, 2020, 12 pages.

Pahl, C., "Containerization and the PaaS Cloud", [Online], pp. 24-31, [Retrieved from Internet on Mar. 28, 2020], (Year: 2015).

Tosatto, et al., "Container-based orchestration in could: state of the art and challenges," [Online], pp. 70-75 [Retrieved from Internet on Mar. 28, 2020], (Year: 2015).

Townend, et al., "Improving Data Center Efficiency Through Holistic Scheduling in Kubernetes", [Online], pp. 156-166, [Retrieved from Internet on Mar. 28, 2020], (Year: 2019).

Notice of Allowance for U.S. Appl. No. 16/261,495, dated Jun. 16, 2020, 7 pages.

Corrected Notice of Allowability for U.S. Appl. No. 16/261,495, dated Jul. 31, 2020, 9 pages.

* cited by examiner

RELEASE ORCHESTRATION FOR PERFORMING PRE RELEASE, VERSION SPECIFIC TESTING TO VALIDATE APPLICATION VERSIONS

TECHNICAL FIELD

One or more implementations relate to the field of updating software; and more specifically, to performing pre-release, version specific testing to validate updated application versions providing cloud services.

BACKGROUND ART

"Cloud" services provide shared resources, software, and information to computers and other electronic devices upon request. In cloud computing environments, software can be accessible over the internet rather than installed locally on in-house computer systems. Cloud services typically involve over-the-internet provision of dynamically scalable and often virtualized resources. Technological details can be abstracted from the users, who no longer have need for expertise in, or control over, the technology infrastructure "in the cloud" that supports them.

The term "micro-services architecture" refers to an architecture in which each of the micro-services does just one thing efficiently and interacts with others of the micro-services as needed. This contrasts with monolithic architectures in which complex software is run on a single, powerful server. Each of the micro-services may use a different type of hardware and/or software to respectively perform a specialized type of processing different from the types of processing performed by the other micro-services. Moreover, the micro-services architecture allows an application to be decomposed into different ones of these smaller micro-services, improving modularity and making the program code easier to understand, design and test. For example, individual micro-services may be modified (e.g., upgraded, swapped out) without affecting the operation of other micro-services used by the application.

A container-orchestration system (COS) automates deployment, scaling and management of containerized applications (also referred to as containerized software and containerized apps); in other words, it provides a platform for automating deployment, scaling, and operations of application containers across clusters of hosts. For example, Kubernetes is a COS that works with a range of container tools, including Docker. Another example of a COS is Docker Swarm. A container is a self-contained execution environment, such as a Linux execution environment; in other words, a container is a standard unit of software that packages up code and all its dependencies, so the application runs quickly and reliably from one computing environment to another. A container image is used to create one or more containers at runtime. A container image is a lightweight, standalone, executable package of software that includes everything needed to run an application: code, runtime, system tools, system libraries and settings (e.g., a Docker container image becomes a Docker container when it is run on Docker Engine; another container engine is Rkt).

With regard to hardware, a COS may include: 1) nodes (also referred to herein as COS nodes), where a node is a representation of a single machine in a COS cluster, where that single machine can be a physical machine in a datacenter or virtual machine hosted on a cloud provider; 2) clusters (also referred to herein as COS clusters), where a cluster represents a more powerful machine resulting from pooling the resources (CPUs and RAM) of the nodes within the cluster; and 3) persistent volumes (a persistent volume is a file system that can be mounted to the cluster, without being associated with any particular node; while traditional local storage associated to each node is treated as a temporary cache to hold programs and data).

With regard to software, a COS may include: 1) containers (also referred to as COS containers, Docker containers, etc.); 2) pods (also referred to herein as "replicas," COS pods," or "kpods" in a Kubernetes implementation), where a pod is the unit of replication and wraps one or more containers that will share the same resources and local network; 3) deployments, where a deployment manages a pod, including declaring the number of replicas of the pod and monitoring the pods; and 4) ingress, where an ingress refers to a communication channel between a service running in a pod and the outside world, and is typically either an ingress controller, a load balancer, Kube-proxy (a combination of a network proxy and a load balancer)). In addition, a COS has support for an abstraction (e.g., a Kubernetes Service) that defines a logical set of pods and a policy by which to access them (sometimes called a micro-service), as well as an API (e.g., Kubernetes Endpoints API) so that the service provided by one of such abstraction can call the service provided by another such abstraction.

In operation, a COS cluster of nodes is formed and a set of one or more persistent volumes is attached to that cluster; and a COS deployment is launched onto the cluster, which deployment causes the spinning up of the declared number of COS pods (where spinning up a COS pod includes executing the containerized application(s) specified in the container image(s) identified for that COS pod) and monitors them.

A COS typically includes a COS controller to control operation of the COS. A COS controller can receive an operation according to configuration information (sometimes referred to as manifests, an "application programming interface (API) object descriptions," or "application configuration information") that describes the desired state of an application in terms of COS constructs.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes pre-release, version specific testing of application (app) versions that provide cloud services. In some implementations, the pre-release, version specific testing approach: 1) allows programmers to write tests ahead of time to be run during the release process, to provide version rules to indicate the version(s) to which to apply the tests, and to provide failure rules to indicate what to do on failure of a test; 2) selects and runs the appropriate tests when the updated (also referred to as new) app version is in the process of being released (but before production traffic is transitioned to the updated app version); and 3) reports and potentially prevents the transition of production traffic to the updated app version based on the failure rules and whether/which test(s) fail. Thus, when programmers attempt to add features to and/or fix/update features of a current (also referred to as existing) version of an app when making an updated version of the app, the tests may be pre-loaded, the tests may be automatically selected based on app version information during release time, and the appropriate action taken responsive to the test results. This is an improvement over the programmers needing to be present to test the features/validate the bug fixes of the updated app version (e.g., through interaction with a Hypertext Transfer Protocol Secure (HTTPS) client that effectively causes HTTPS requests to be sent to, and responses to be expected from, the updated app version) after release (when the updated app version is getting production traffic).

Exemplary System

Figure 1:
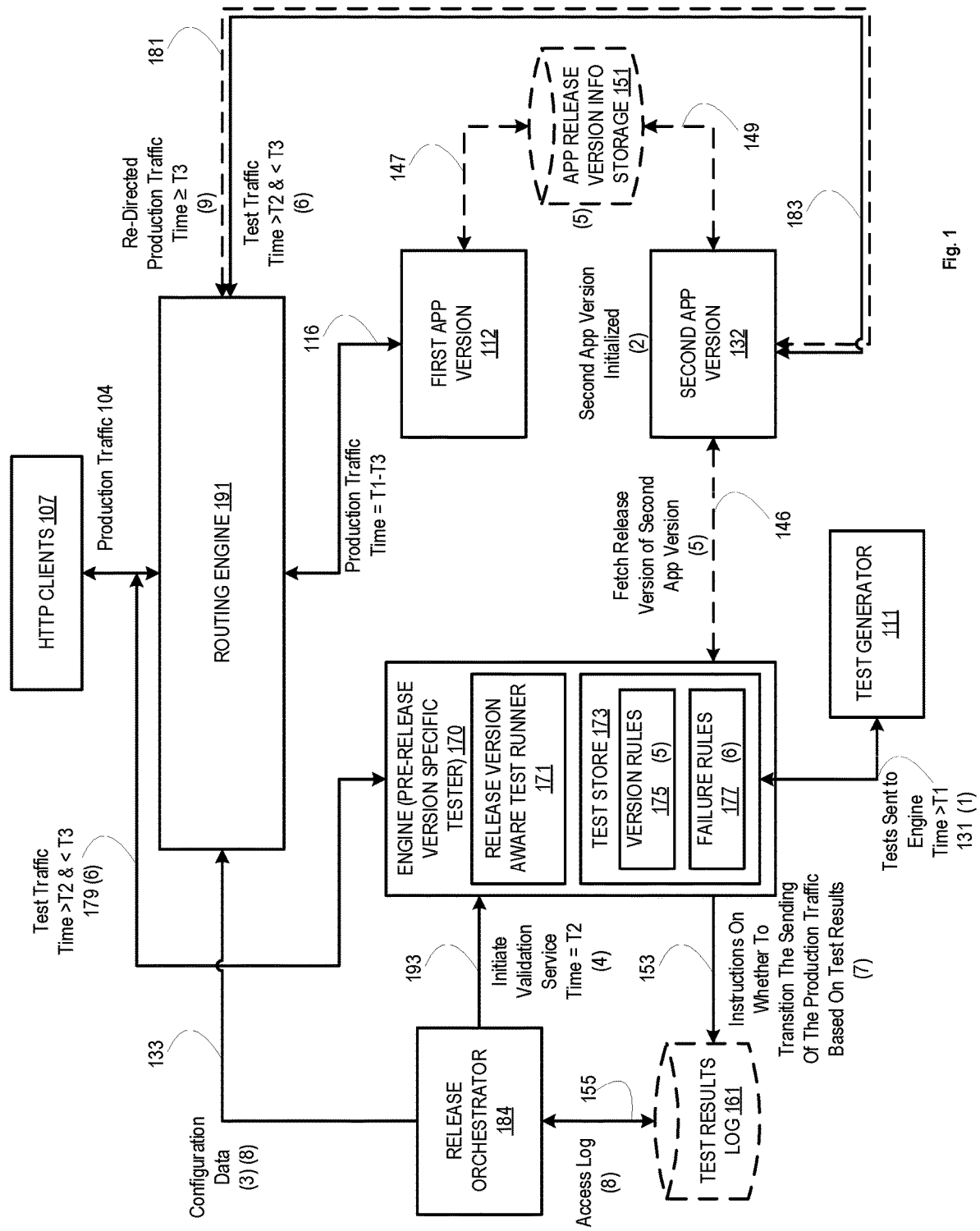
FIG. 1 is a block diagram illustrating a system for performing pre-release, version specific testing of application versions according to some example implementations.

FIG. 1 is a block diagram illustrating a system for performing pre-release, version specific testing of application versions according to some example implementations. FIG. 1 illustrates a release orchestrator 184 (also referred to as a runlist sequencer or sequencer) to control (also referred to as facilitate or orchestrate) the release of a second application (app) version 132 (also referred to as an updated app version), where the second app version 132 is an updated version of a first app version 112 (also referred to as a current app version).

Overview

The release orchestrator 184 controls the release process of updates to an app. For each release or an update to a first app version 112, the release orchestrator 184 is to: 1) determines that the second app version 132 is live and ready to receive traffic; 2) control a validation of the viability of the second app version 132 through control of an engine 170; and 3) transition the production traffic 104 from the first app version 112 to the second app version 132 (so that the first app version 112 and the second app version 132 respectfully become the old version and the current version) if and only after the second app version 132 has been validated (via pre-release, version aware testing). In the situation where the result of the test traffic indicates that the second app version 132 has one or more problems and cannot be validated, then the release orchestrator 184 does not initiate the transition and the production traffic 104 continues to be routed to the first app version 112; since the first app version 112 is assumed to be stable, there should be no interruption in the handling of the production traffic 104.

Orchestrating the release of the second app version 132 includes the release orchestrator 184 causing the validation of the second app version 132 to transition to sending production traffic 104 to the second app version 132 instead of the first app version 112. The operations of the release orchestrator 184 include sending instructions to an engine 170 to perform the pre-release, version specific testing of the second app version 132 and sending configuration data to a routing engine 191 to control the routing of production traffic and test traffic. In one implementation, the routing engine 191 may be implemented as a proxy control plane (e.g., a proxy control plane 486 in FIG. 4) and an app aware proxy (e.g., an app aware proxy 408 in FIG. 4).

The engine 170 (as referred to as a pre-release, version specific tester) facilitates the testing of the updated version of an application and the determination of whether the updated version of the application is validated for production traffic. The engine 170 includes a release version aware test runner 171 and a test store 173. Each test in the test store 173 includes test-specific version rules 175 and failure rules 177.

To facilitate the validation process, the engine 170: 1) receives instructions from the release orchestrator 184 to initiate a validation service for the second app version 132; 2) automatically determines one or more tests to apply to the second app version 132 using version information for the second app version 132 and version rules 175; 3) generates and sends test traffic via an HTTPS request to an HTTPS endpoint (e.g., a Uniform Resource Locator (URL) to the routing engine 191, including an indicator (e.g., in a header of the test traffic) which the routing engine 191 recognizes as indicating that the received traffic is test traffic and should be directed to the second app version 132; and 4) generates instructions on whether to transition the sending of production traffic from the first app version 112 to the second app version 132 based on failure rules and the responses to test traffic. The engine 170 can generate the test traffic to mimic production traffic and to test features changed/added to the second app version 132.

The engine 170 may additionally perform synthetics monitoring (which may include the running of non-app-version specific tests on a schedule, but also allows these test to be done on demand) and/or warmup traffic generation (which may include the generation of traffic intended to reduce the response time of the updated app version after the transition to production traffic), and can be implemented as a one or more units. For instance, when the engine 170 is implemented as three separate units they may be referred to as: 1) a synthetics monitor (e.g., Thousand Eyes, App Dynamics); 2) a pre-release, version specific tester; and 3) a warmup traffic generator.

Additional Detail

Starting at time T1, the production traffic 104 is being routed by the routing engine 191 from HTTPS clients 107 to a first app version 112 (see line 116). The first app version 112 is the version of the app that is currently running and providing a cloud service(s), including currently processing the production traffic. In some implementations, the routing engine 191 includes first app version configuration information that causes the production traffic 104 to be routed to the first app version 112. The first app version 112 is to be replaced by the orchestrated release of a second app version 132.

At (1), at some point after time T1, a test generator 111 sends tests to an engine 170 (see line 131). The tests can also be referred to as release time, version specific tests because they are version(s) specific and are to be applied to updated application versions during a validation process during the release process and prior to the transition of production traffic (and thus are pre-release). By way of example, release time version specific tests may include tests that are bug fix confirmation tests. The release time, version specific tests can be written by the above-discussed programmer of the bug fix or the updated/new feature and provided to the test store 173. The release time, version specific tests are associated with version rules that indicate what version(s) of applications the test is applicable to (e.g., while in some implementations each test is annotated, in other implementations there is a mechanism to associate groups of rules). In some implementations the version rules can include a minimum version identifier field, a maximum version identifier field, and a test application indication. The minimum version identifier field provides an indication of a minimum application version to which a test is to be applied. The maximum version identifier field provides an indication of a maximum application version to which a test is to be applied. A test application indicator indicates whether the minimum version identifier field, maximum version identifier field, or both, applies to the test. For example, if the test application indicator indicates that both the minimum and maximum version identifier fields apply to a given test, the two fields are an upper and lower bound on what version(s) the given test applies to. While in some implementations the version rules include a minimum version identifier field, a maximum version identifier field, and a test application indication, other implementations may use different approaches to reflect which tests apply to which application versions (e.g., a single field that indicates a version identifier; the minimum and maximum version fields, but not the indicator field, that can be set to the same value when the test applies to a single version; the minimum and maximum version fields, but not the indicator field, where a predetermined value in one or the other means that one is not to be used; etc.)

Each release time, version specific test is associated with a failure rule that indicates actions to perform in response to a test failure (e.g., while in some implementations each test is annotated, in other implementations there is a mechanism to associate groups of tests with different ones of the failure rules). While in one implementation, the failure rules for each release time, version specific test can indicate whether to: (1) send a notification indicating whether to prevent or allow the transitioning of the production traffic from the first app version to the second app version; or (2) send the tests results to allow the transition decision to be performed by another entity (e.g., the release orchestrator 184); other implementations may perform additional or different actions in addition to (1) and (2) (e.g., re-execute tests to confirm test failures; etc.), or fewer actions than (1) and (2) (e.g., only send the notification indicating whether to allow or prevent the transition).

The engine 170 stores the received tests in a test store 173. The engine 170 can also analyze or parse the received release time, version specific tests to identify the version rules and failure rules associated with each test. In one implementation, the engine 170 stores the version rules and failure rules in separate data structures, version rules 175 and failure rules 177, respectively. In other implementations, the release time, version specific test, and their corresponding version rules and failures are stored in a single data structure. As discussed above, the engine 170 stores the release time, version specific tests prior to the app version associated (e.g., the second app version 132) with the tests being initialized or deployed.

At (2), release orchestrator 184 determines that the second app version 132 is live and ready to accept test traffic. The second app version 132 is an updated version of the first app version 112 and can include new features or fixes to existing features. The second app version 132 is the version of the app to be deployed in place of the first app version 112 (upon validation of the second app version 132). Both the first app version 112 and the second app version 132 are associated with app version identifiers that indicates version information for the corresponding app version. While in some implementations the app version identifiers are stored within the code/data of the first app version 112 and second app version 132 themselves (e.g., the app version ID for the second app version 132 could be stored within the second app version 132—by way of particular example in which containers are used, the second app version ID could be stored within the container image), alternative implementations may use another approach (e.g., the first app version 112 and the second app version 132 optionally retrieve their version information from an app release version info storage 151 (see lines 147 and 149, respectively).

At (3), the release orchestrator 184 sends configuration data to the routing engine 191 (see line 133) as part of the validation process for the second app version 132. The configuration data can include information instructing the routing engine 191 on how to handle production traffic and test traffic. For example, the configuration data can include information on an indicator expected to be found in the test traffic that the routing engine 191 will receive as part of a validation process for the second app version 132. For example, the indicator can be information in a header of test traffic. Thus, the routing engine 191 can identify the test traffic based on the configuration data and direct such test traffic to the second app version 132 instead of the first app version 112, while continuing to send the production traffic 104 to the first app version 112.

At (4), at time T2, the release orchestrator 184 sends instructions to the engine 170 to initiate the validation process of the second app version 132 (see line 193). The instructions direct the engine 170 to generate test traffic as part of the validation process of the second app version 132 to determine whether to transition the sending of the production traffic 104 to the second app version 132 instead of a first app version 112. The instructions from the release orchestrator 184 include information on the indicator that the engine 170 is to put in all test traffic (e.g., in the header) to allow the routing engine 191 to differentiate the test traffic from production traffic. In some implementations, the instructions from the release orchestrator 184 also include information identifying the second app version 132 (e.g., an internet protocol (IP) address of the second app version 132). The first app version 112 and second app version 132 may share the same IP address (e.g., load balanced behind a publicly exposed external URL/IP address), and the indicator that the engine 170 is to put in all test traffic distinguishes the test traffic from other traffic (e.g., the production traffic).

While in some implementations, the information identifying the second app version 132 also includes the unique application version identifier assigned to the second app version 132, in other implementations, the instructions from the release orchestrator 184 include information to allow the engine 170 to perform operations to retrieve the unique application version identifier assigned to the second app version 132. For example, the instructions from the release orchestrator 184 can include a predetermined HTTPS endpoint (e.g., a URL) established by the second app version 132 to which a request can be sent with the expectation that the app version identifier (accessible to the second app version 132 as discussed above) will be sent in a response to that request.

At (5), the engine 170 performs operations to determine one or more release time, version specific tests to run to validate the second app version 132. When the instructions from the release orchestrator 184 do not include the application version identifier assigned to the second app version 132, the engine 170 first fetches the release version of the second app version 132 (see line 146). As discussed above, in some implementations the engine 170 generates an HTTPS request directed to an HTTPS endpoint (e.g., a URL) generated by the second app version. The HTTPS request can be an HTTP GET request. In such implementations, the HTTPS request can be sent through the routing engine 191 to the second app version 132, and an HTTPS response sent back from the second app version 132 to the engine 170 via the routing engine 191, where the HTTPS response includes the application version identifier for the second app version 132. In other implementations, the engine 170 queries the second app version 132 for its application version identifier, and the second app version 132 reads the application version identifier from an app release version info storage 151 (see line 149). The app release version info storage 151 can be a file or a storage structure. In other implementations, the application version identifier was included in the second app version 132 (e.g., in a container image (e.g., second app version container image 442 in FIG. 4)).

The release version aware test runner 171 selects one or more release time, version specific tests from the test store 173 using the application version identifier for the second app version 132 and version rules 175. As discussed above, in some implementations, the release version aware test runner 171 selects the one or more release time, version specific tests from test store 173 based on the application version identifier, minimum version identifier fields, maximum version identifier fields, and test application indicators.

At (6), after a time T2 and before a time T3, the engine 170 generates test traffic and sends the test traffic so that it is included with the production traffic 104 being received by routing engine 191 (see line 179). The test traffic can be in the form of HTTPS requests, with the engine 170 expecting to receive HTTPS responses to the HTTPS requests. The engine 170 generates the test traffic to include the above discussed indicator (e.g., in a header of the test traffic) the routing engine 191 recognizes as being associated with test traffic (based on the configuration data the routing engine 191 received in (3)). The routing engine 191 directs the test traffic to the second app version 132 (see line 183), while continuing to direct the production traffic to the first app version (see line 116). The second app version 132 sends HTTPS responses through the routing engine 191 back to the engine 170 (see lines 181 and 179).

Based on the responses to the test traffic, the engine 170 determines whether one or more of the tests failed. The engine 170 determines a test has failed when the expected HTTPS response is not received (e.g., no response is received, the type and/or content of the response is incorrect) from the second app version 132. If one or more of the tests failed, the engine 170 retrieves the failure rules 177 for the failed tests and determines an appropriate action. For example, the engine 170 determines whether the failure rules 177 for each failed tests indicates either: (1) generate a notification and the transition of production traffic from the first app version 112 to the second app version 132 should not occur, or (2) generate a notification but allow the transition of production traffic from the first app version 112 to the second app version 132 to occur.

At (7), the engine 170 generates instructions on whether to transition the sending of the production traffic from the first app version 112 to the second app version 132 based on the results of the tests and any applicable failure rules. While in one implementation the engine 170 sends the instructions directly to the release orchestrator 184, in other implementation the instructions are stored in a test results log 161 (e.g., that is a storage or data structure external to engine 170 (see line 153) or that is a part of engine 170) that is accessible to the release orchestrator 184 (e.g., see line 155).

At (8), the release orchestrator 184 performs operations in response to the instructions from the engine 170. When the instructions indicate to transition the sending of the production traffic from the first app version 112 to the second app version 132 (e.g., either no tests failed, or no tests failed with a failure rule blocking the transitioning), the release orchestrator 184 generates updated configuration data for sending to the routing engine 191 (see line 133). The configuration data indicates to the routing engine 191 that it should transition to sending future production traffic 104 from HTTPS clients 107 to the second app version 132 instead of the first app version 112.

At (9), after time T3, because the second app version 132 has been successfully validated, the routing engine 191 re-directs the future production traffic from being sent to the first app version 112 to being sent to the second app version 132 (see line 181). Performing the transition from the first app version 112 to the second app version 132 after the second app version 132 is validated is advantageous over conventional systems which switch production traffic over to the updated version without having performed this type of pre-release, version specific validation because any unexpected errors can result in the interruption of the processing of the production traffic 104. Such an interruption would be visible to customers, and therefore result in a less than optimal customer experience.

Exemplary Operation

Figure 2A:
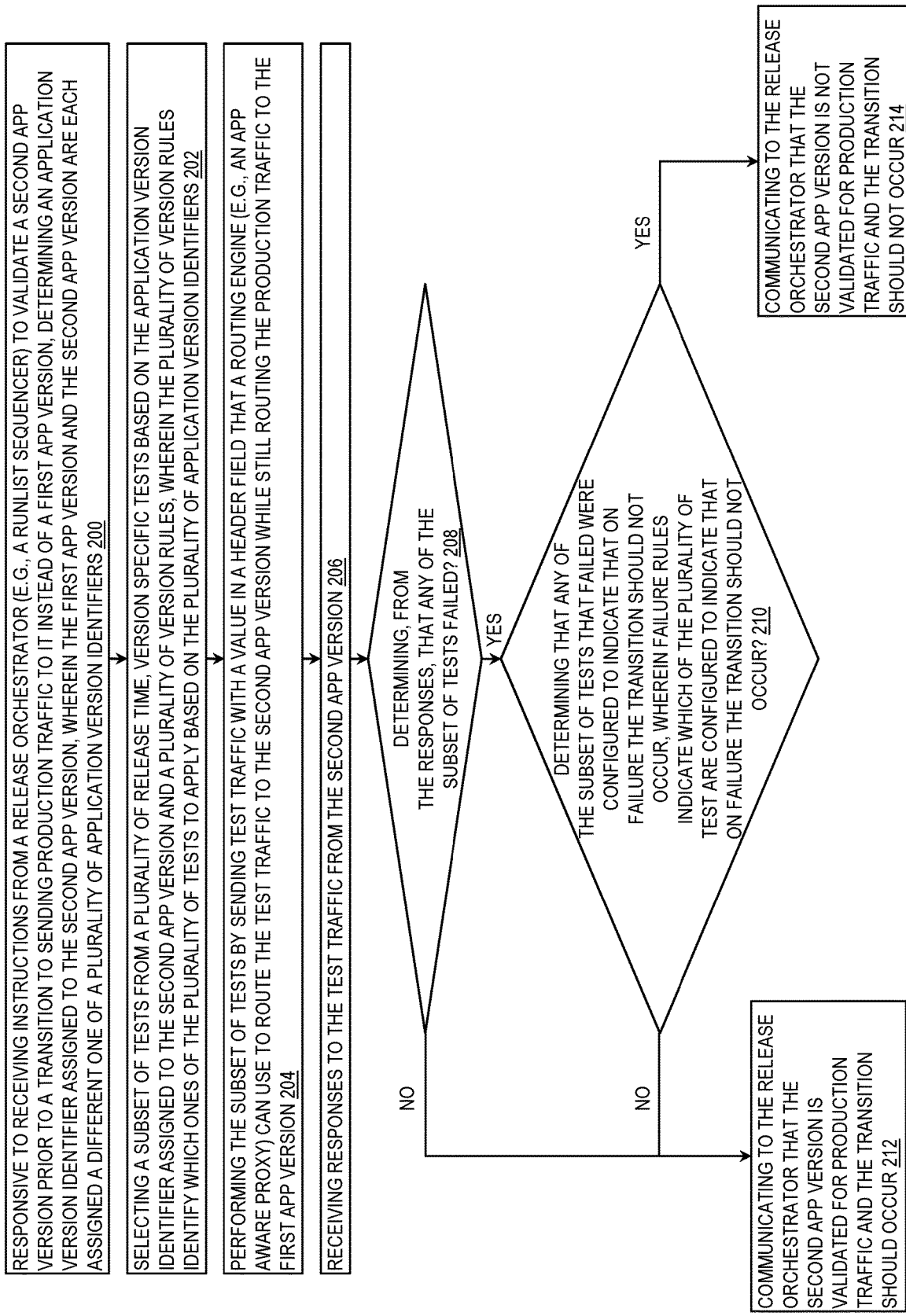
FIG. 2A is a flow diagram illustrating a method for a system for pre-release, version specific testing of applications according to some example implementations.

FIG. 2A is a flow diagram illustrating a method for a system for pre-release, version specific testing of applications according to some example implementations. Responsive to receiving instructions from a release orchestrator to validate a second app version prior to a transition to sending production traffic to the second app version instead of a first app version, determining in block 200 an application version identifier assigned to the second app version, where the first app version and the second app version are each assigned a different one of a plurality of application version identifiers. The second app version is an updated version of the first app version. From block 200, control passes to block 202.

Block 202 shows the selecting of a subset of tests from a plurality of release time, version specific tests using the application version identifier assigned to the second app version and a plurality of version rules. The plurality of version rules identify which ones of the plurality of tests to apply based on the plurality of application version identifiers. From block 202, control passes to block 204.

Block 204 shows the performing of the subset of tests by sending test traffic with a value in a header field that a routing engine can use to route the test traffic to the second app version while continuing to route the production traffic to the first app version. From block 204, control passes to block 206.

Block 206 shows the receiving of responses to the test traffic from the second app version. From block 206, control passes to block 208.

In block 208, it is determined, from the responses received from the second app version, whether any of the subset of tests failed. If not, control passes to block 212. Otherwise, control passes to block 210.

In block 210, it is determined whether any of the subset of tests that failed were configured to indicate that on failure the transition should not occur, where failure rules indicate which of the plurality of test are configured to indicate that on failure the transition should not occur. If not, control passes to block 212. Otherwise, control passes to block 214.

Block 212 shows the communicating to the release orchestrator that the second app version is validated for production traffic and the transition of the production traffic from the first app version to the second app version should occur.

Block 214 shows the communicating to the release orchestrator that the second app version is not validated for production traffic and the transition of the production traffic from the first app version to the second app version should not occur.

Figure 2B:
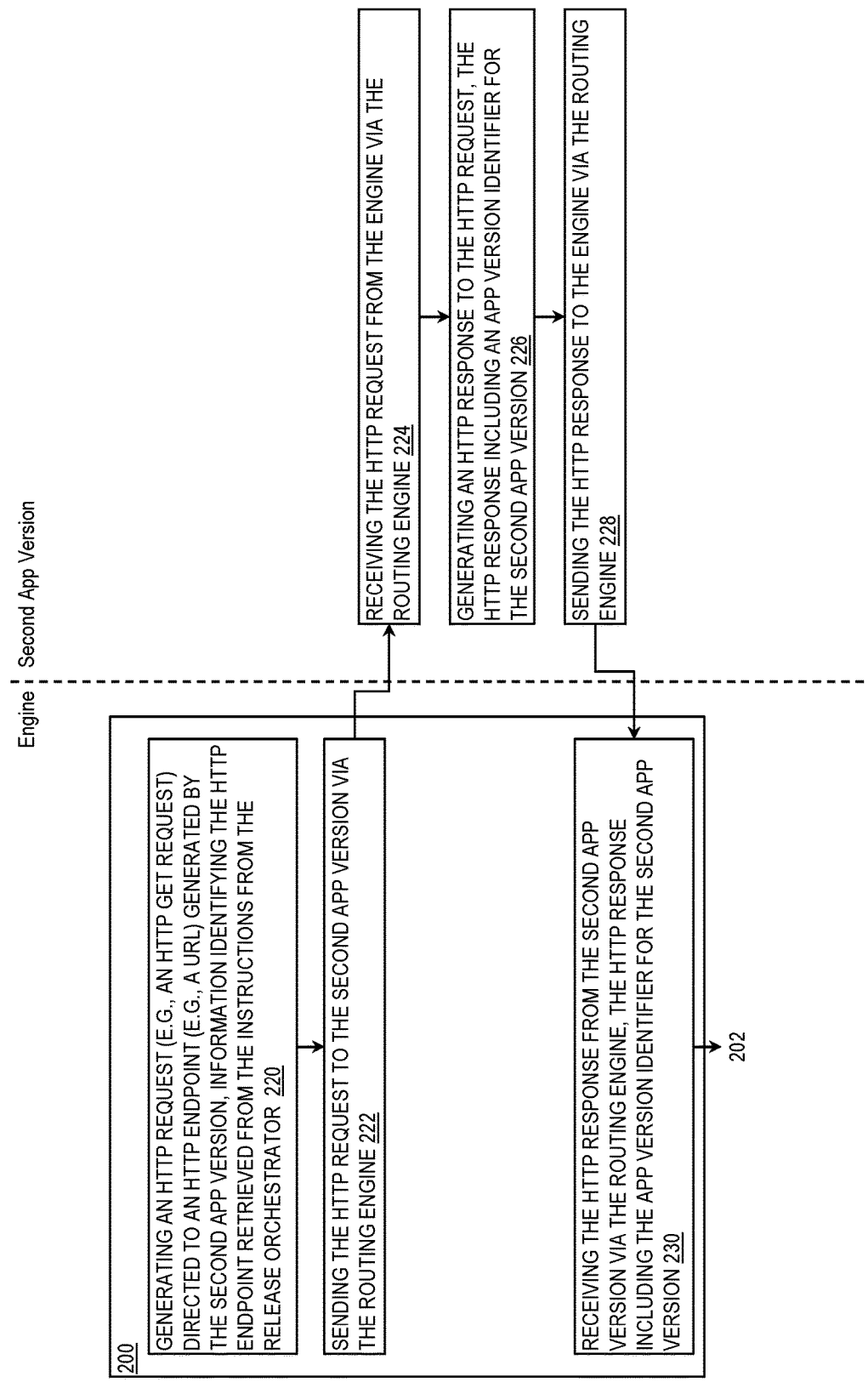
FIG. 2B is a flow diagram illustrating a method for an engine and a second app version according to some example implementations.

FIG. 2B is a flow diagram illustrating a method for an engine and a second app version according to some example implementations. FIG. 2B includes an exploded version of block 200 according to some implementations.

In block 220, the engine generates an HTTPS request directed to an HTTPS endpoint (e.g., a URL) established by the second app version.

In block 222, the engine sends the HTTPS request to the second app version via the routing engine. In block 224, the second app version receives the HTTPS request from the engine via the routing engine.

In block 226, the second app version generates an HTTPS response to the HTTPS request, the HTTPS response including an app version identifier for the second app version.

In block 228, the second app version sends the HTTPS response to the engine via the routing engine.

In block 230, the engine receives the HTTPS response from the second app version via the routing engine, the HTTPS response including the app version identifier for the second app version. From block 230, control passes to block 202.

As previously described, in other implementations, the engine receives the app version identifier for the second app version in the instructions received from the release orchestrator, or the second app version retrieves the app version identifier from an app release version info storage or a container image.

Figure 2C:
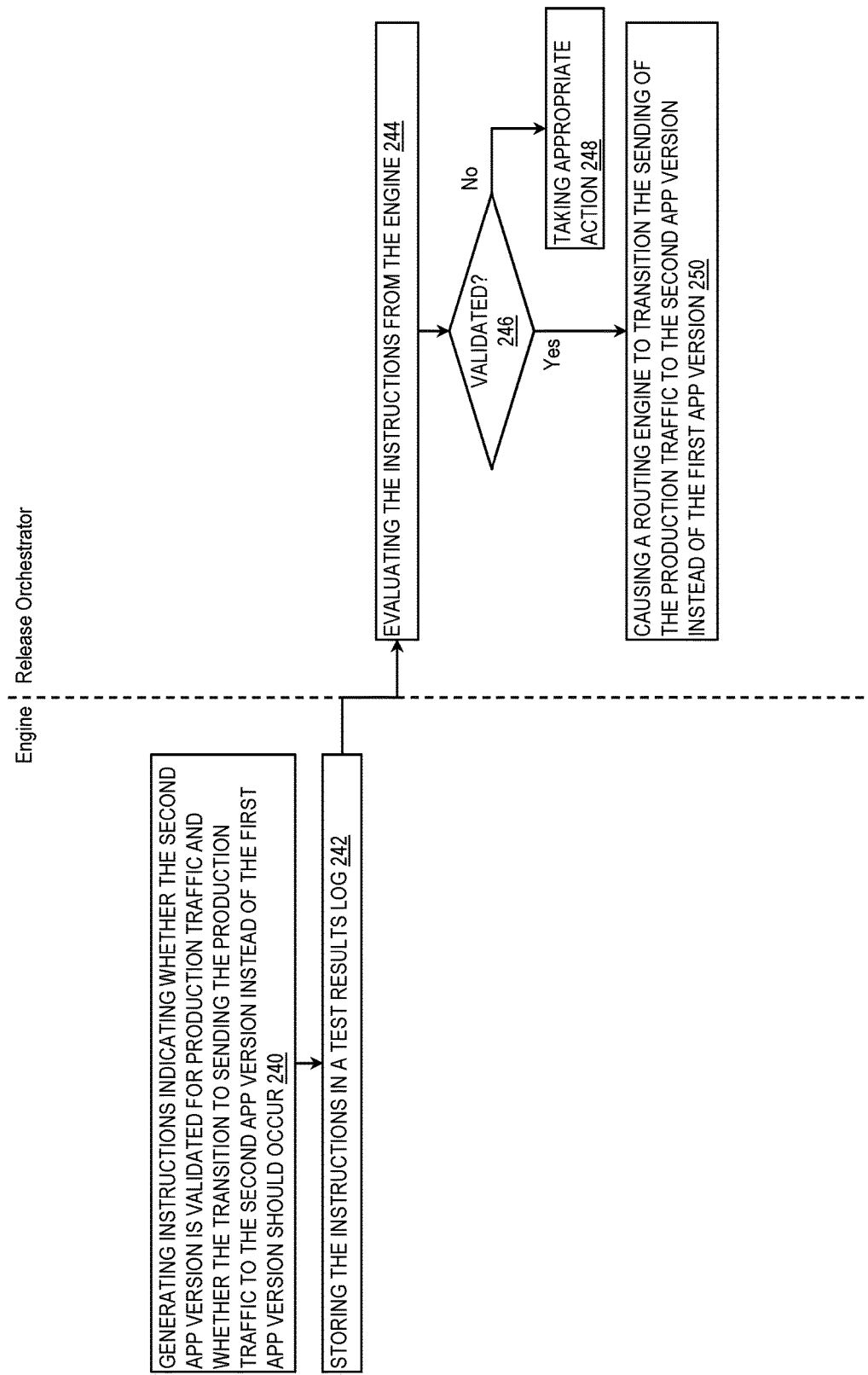
FIG. 2C is a flow diagram illustrating a method for an engine and a release orchestrator according to some example implementations.

FIG. 2C is a flow diagram illustrating a method for an engine and a release orchestrator according to some example implementations. In block 240, the engine generates instructions indicating whether the second app version is validated for production traffic (put another way, whether the transition to sending the production traffic to the second app version instead of the first app version should occur). As previously described: 1) when no tests failed, the instructions can indicate to the release orchestrator to allow the transition of production traffic from the first app version to the second app version; and 2) when one or more tests failed, the version rules for the failed tests indicate whether to block the transition of production traffic from the first app version to the second app version.

In block 242, the engine stores the instructions in a test results log as previously described.

In block 244, the release orchestrator evaluates the instructions from the engine. As described previously, the release orchestrator can access the test results log to retrieve the instructions or receive the instructions from the engine.

In block 246, the release orchestrator determines whether the second app version is validated for production traffic (put another way, whether the transition to sending the production traffic to the second app version instead of the first app version should occur). If not, control passes to block 248. Otherwise, control passes to block 250.

In block 248, the release orchestrator takes appropriate action (e.g., terminating the release of the update and any notifying subscribing services of the failure).

In block 250, the release orchestrator causes a routing engine to transition the sending of the production traffic to the second app version instead of the first app version.

The above implementations are advantageous as compared to some conventional systems. For example, one conventional system includes a synthetics monitoring service to monitor ongoing health of the system. This synthetics monitoring service is designed to run non-app-version specific tests on a schedule, but also allows these test to be run on demand (e.g., by appropriate adjusting the schedule. As such, this synthetics monitoring service does not support and is not designed for pre-release, version specific tests. Rather, this conventional system uses a combination of: 1) having the programmers be present to test the features of the updated app version (e.g., through interaction with an HTTPS client that effectively causes HTTPS requests to be sent to, and responses to be expected from, the updated app version) after release (when the updated app version is getting production traffic; and 2) the synthetics monitoring service to immediately run monitoring test after the production traffic has already been transitioned to the update app version. Thus, this conventional system has the following drawbacks: 1) validation tests are not run or are run after production traffic is already being sent to the updated version; 2) they require bringing down half the capacity, and thus are scheduled at off-peak hours; 3) they require human interaction and thus do not scale well; 4) production traffic can ping pong between different versions leading to an unsatisfactory service experience; 5) service degradation during the release window is often observable by customers; and 6) in-flight customer activity during a release can be disrupted and transactions fail, especially when the updated version is found to be unstable.

Thus, the above implementations are advantageous in that they: 1) allow for pre-release, version specific validation tests to be run before production traffic is sent to the updated version (thus making it "seamless"); 2) do not require the same level of human interaction allowing updated app version releases to be performed at any time and thus scale well; and 3) production traffic can be made not to ping pong between different versions (because there is a point in time when the production traffic 104 is switched (see T3 in FIG. 1), rather than routing production traffic to both versions or a rolling update. Since releases pose significant risk to a service, the above implementations can scale up efficiently, reduce data center costs, and maintain high trust.

Exemplary Implementations

Receipt of data by the system may occur differently in different implementations (e.g., it may be pushed to the system (often referred to as a push model), pulled by the system (often referred to as a pull model), etc.)

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all the vendors' data. As another example, in the context of Platform as a Service (PAAS), one set of tenants may be third party application developers providing applications/services and another set of tenants may be customers of different ones or all the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 3A:
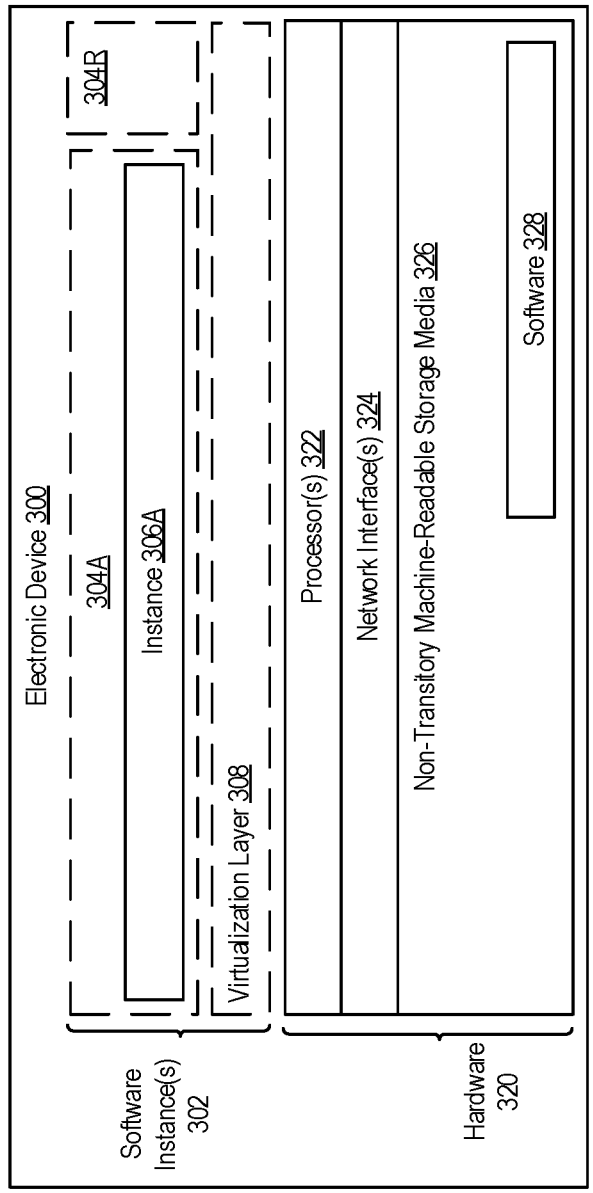
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and non-transitory machine-readable storage media 326 having stored therein software 328 (which includes instructions executable by the set of one or more processor(s) 322). Each of the previously described end user clients and the cloud service may be implemented in one or more electronic devices 300. In one implementation: 1) the engine is implemented in a separate set of one or more of the electronic devices 300 (e.g., a set of one or more server electronic devices where the software 328 represents the software to implement the pre-release, version specific testing service); 2) each of the end user clients is implemented in a separate one of the electronic devices 300 (e.g., in user electronic devices operated by users where the software 328 represents the software to implement end user clients to interface with the cloud service (e.g., a web browser, a native client, a portal, a command-line interface, and/or an application program interface (API) based upon protocols such as Simple Object Access Protocol (SOAP), Representational State Transfer (REST), etc.)); 3) the cloud service is implemented in a separate set of one or more of the electronic devices 300 (e.g., a set of one or more server electronic devices where the software 328 represents the software to implement the cloud service—that is, the first app version and the second app version); and 4) in operation, the electronic devices implementing the end user clients, the cloud service, and the engine would be communicatively coupled (e.g., by a network) and would establish between them (or through one or more other layers) connections for the end user clients and engine to submit requests to the above described cloud service, and for the cloud service to return responses to the end user clients. Other configurations of electronic devices may be used in other implementations (e.g., an implementation in which the engine and the cloud service are implemented on a single electronic device 300).

In electronic devices that use compute virtualization, the set of one or more processor(s) 322 typically execute software to instantiate a virtualization layer 308 and software container(s) 304A-R (e.g., with operating system-level virtualization, the virtualization layer 308 represents the kernel of an operating system (or a shim executing on a base operating system) that allows for the creation of multiple software containers 304A-R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 328 (illustrated as instance 306A) is executed within the software container 304A on the virtualization layer 308. In electronic devices where compute virtualization is not used, the instance 306A on top of a host operating system is executed on the "bare metal" electronic device 300. The instantiation of the instance 306A, as well as the virtualization layer 308 and software containers 304A-R if implemented, are collectively referred to as software instance(s) 302.

Alternative implementations of an electronic device may have numerous variations from that described above. For example, customized hardware and/or accelerators might also be used in an electronic device.

Exemplary Environment

Figure 3B:
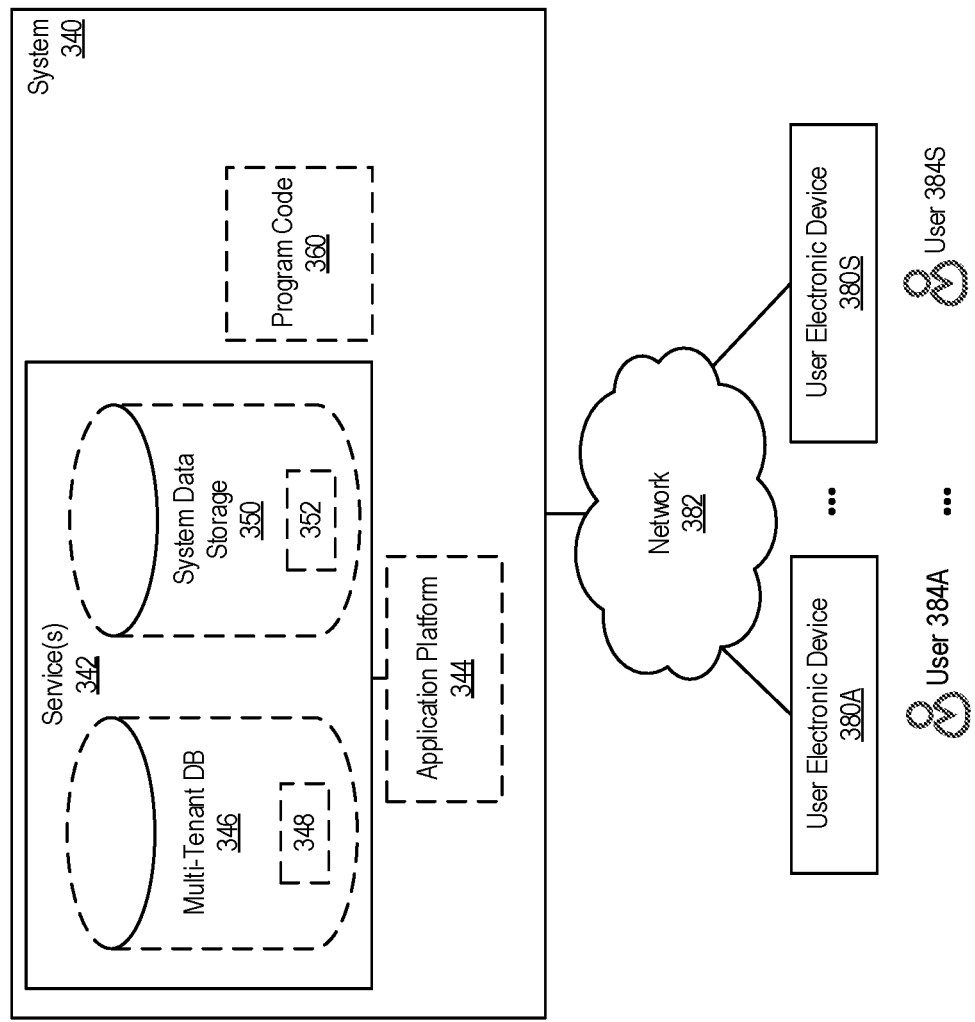
FIG. 3B is a block diagram of an environment where the above discussed release orchestration technique may be used, according to some implementations.

FIG. 3B is a block diagram of an environment where the above discussed release orchestration technique may be used, according to some implementations. A system 340 includes hardware (a set of one or more electronic devices) and software to provide service(s) 342, including the cloud service. The system 340 is coupled to user electronic devices 380A-S over a network 382. The service(s) 342 may be on-demand services that are made available to one or more of the users 384A-S working for one or more other organizations (sometimes referred to as outside users) so that those organizations do not need to necessarily be concerned with building and/or maintaining a system, but instead makes use of the service(s) 342 when needed (e.g., on the demand of the users 384A-S). The service(s) 342 may communication with each other and/or with one or more of the user electronic devices 380A-S via one or more Application Programming Interface(s) (APIs) (e.g., a Representational State Transfer (REST) API). The user electronic devices 380A-S are operated by users 384A-S.

The application(s) providing one or more of the service(s) 342 are updated from using a current version to an updated version using the above discussed release orchestration technique.

The service(s) 342, including the one or more services provided by application(s) that are updated using the above discussed release orchestration technique, include a customer relationship management (CRM) service (e.g., Sales Cloud by salesforce.com, Inc.), a contracts/proposals/quotes service (e.g., Salesforce Configure, Price, and Quote (CPQ) by salesforce.com, Inc.), a customer support service (e.g., Service Cloud and Field Service Lightning by salesforce.com, Inc.), a marketing service (e.g., Marketing Cloud, Salesforce Data Management Platform (DMP), and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). For example, system 340 may include an application platform 344 that enables PAAS for creating, managing, and executing one or more applications developed by the provider of the application platform 344, users accessing the system 340 via one or more of user electronic devices 380A-S, or third-party application developers accessing the system 340 via one or more of user electronic devices 380A-S.

In some implementations, the system 340 is a multi-tenant cloud computing architecture and one or more of the service(s) 342 may utilize one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user electronic device 380A-S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the one or more multi-tenant database 346 and/or system data storage 350.

In some implementations, the service(s) 342 are implemented using virtual applications dynamically created at run time responsive to queries from the user electronic devices 380A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the cloud service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 340 and the user electronic devices 380A-S.

Each user electronic device 380A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 340. For example, the user interface device can be used to access data and applications hosted by system 340, and to perform searches on stored data, and otherwise allow a user 384 to interact with various GUI pages that may be presented to a user 384. User electronic devices 380A-S might communicate with system 340 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTPS is used, one or more user electronic devices 380A-S might include an HTTPS client, commonly referred to as a "browser," for sending and receiving HTTPS messages to and from server(s) of system 340, thus allowing users 384 of the user electronic device 380A-S to access, process and view information, pages and applications available to it from system 340 over network 382.

Exemplary Use with a Container Orchestration System (COS)

Figure 4:
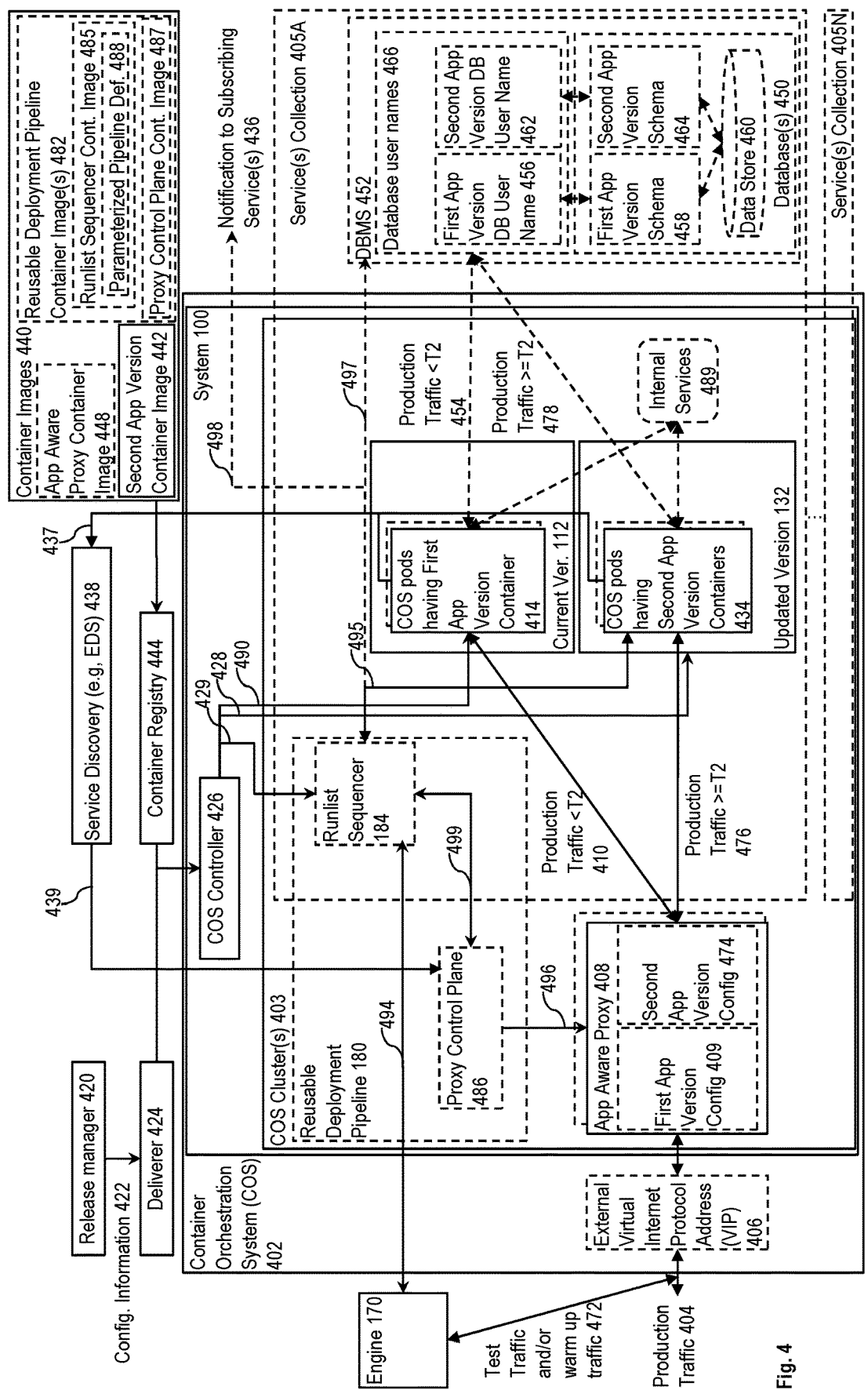
FIG. 4 is a block diagram of another environment where the above discussed release orchestration technique may be used, according to some implementations.

FIG. 4 is a block diagram of the above discussed release orchestration technique used with a Container Orchestration System (COS), according to some implementations. FIG. 4 illustrates a COS 402 (e.g., Kubernetes, Docker Swarm) to facilitate the communication of production traffic 104 (e.g., via an external virtual internet protocol address (VIP) 406 of the COS 402) with a system 400 within the COS 402. Elements of FIGS. 1 and 4 with identical label numbers can be considered equivalent components.

Overview

The system 400 controls the release process of updates to an application (app) that runs in COS pods to provide a cloud service(s). For each release of an update to a current version 112, the system 400 is to: 1) bring up the updated version 132 in new COS pods; 2) control the updating of any underlying state if necessary (e.g., if the service uses a set of one or more database(s) 450, then update the database(s) as necessary); 3) control a validation of the viability of the updated version 132 through control of an engine 170; 4) switch the production traffic 104 from the current version 112 to the updated version 132 (so that the current version 112 and the updated version 132 respectfully become the old version and the current version) if and only after the updated version 132 has been validated (also referred to a pretesting); and 4) gracefully terminate the now old version.

FIG. 4 also illustrates a reusable deployment pipeline 480 for release orchestration that is independent of, but combinable with, a system such as the system 400. In some implementations, the reusable deployment pipeline operates at the application level and causes the validation of the updated application version before production traffic is sent (causes the generation and transmission of test traffic that mimics production traffic, as well as causes the test traffic to be sent to the updated version while the production traffic continues to be sent to the current version) (sometimes referred to as release trust validation), causes the switch to sending production traffic to the updated version (traffic management), and optionally coordinates immediate post-release activities (e.g., database activities such as dropping custom indexes, deleting tables, etc.).

In some implementations that use the system 400 and the reusable deployment pipeline 480, configuration information 422 causes the COS 402 to spin up containers with the updated version 132, trigger the operation of the reusable deployment pipeline 480 with a set of parameters from the configuration information 422, and use readiness responses from the updated version 132 to control the shutdown of the containers of the old version (what was formerly the current version 112) (including a forced shut down after a time out period as needed) in a manner that provides an opportunity for the old version to finish inflight tasks. The updated version 132 of the app may assist by supporting a mechanism that responds affirmatively to readiness requests from the COS 402 only after the production traffic 104 has been switched to the updated version 132.

Also, for apps that have a stateful database behind them that needs to also be updated to interoperate with the updated version 132, the updated version 132 may assist by implementing leader election, where the leader causes pre-release database preparation to be performed. The update may also be implemented directly by the reusable deployment pipeline 480.

The reusable deployment pipeline 480 may operate at the application level and cause: 1) a validation of the updated version 132 before production traffic 104 is sent to the updated version 132 (e.g., causes the generation and transmission of test traffic that mimics production traffic, as well as causes the test traffic to be sent to the updated version 132 while the production traffic 104 continues to be sent to the current version 112) (sometimes referred to as release trust validation); 2) cause a synchronous or graduated transition to sending the production traffic 104 to the updated version 132 (sometimes referred to as traffic management); and 3) a set of zero or more post-release activities (e.g., database activities such as dropping custom indexes, deleting tables, etc.). In some implementations, the validation is performed by the engine 170 that: 1) operates on demand responsive to the reusable deployment pipeline 480; 2) sends test and/or warm up traffic 472 with a header field value that may be used to route that traffic to the updated version 132; 3) checks the results of that traffic to determine if the updated version 132 is validated for production traffic; and 4) communicates to the reusable deployment pipeline 480 whether the updated version 132 is validated to receive production traffic. In one implementation, the engine 170 performs pre-release, version specific validation of the updated version 132 by selecting a subset of tests from release time, version specific tests based on the version of the updated version 132 and version rules 175 and determines if the updated version 132 is validated by comparing the results of the test and/or warm up traffic 472 with one or more failure rules 177 of the selected subset of tests.

The above implementations are advantageous as compared to some conventional systems. For example, a first conventional system using a monolithic application approach (does not use a COS) and update releases have the following drawbacks: 1) validation tests are not run or are run after production traffic is already being sent to the updated version; 2) they require bringing down half the capacity, and thus are scheduled at off-peak hours; 3) they require human interaction and thus do not scale well; 4) production traffic can ping pong between different versions leading to an unsatisfactory service experience; 5) service degradation during the release window is often observable by customers; and 6) in-flight customer activity during a release can be disrupted and transactions fail, especially when the updated version is found to be unstable.

A second conventional system uses a COS (e.g., Kubernetes) that has limited support for releasing updates, and it has the following drawbacks: 1) shuts down the old version as the updated version becomes ready, where being "ready" does not include a validation test of the updated version before sending the production traffic; 2) it uses a rolling update model that suffers from some of the same drawbacks described above (e.g., service experience inconsistencies and incorrect behaviors due to ping ponging); and 3) has no built-in traffic director that can be used for traffic routing and switching.

Thus, the above implementations are advantageous in that they: 1) allow for validation tests to be run before production traffic is sent to the updated version (thus making it "seamless"); 2) ensure, through a set of threshold numbers in the configuration information 122 as described later herein, a configurable number of the COS pods having the second app version containers 134 be ready before transitioning the production traffic to the updated version 132, which configurable number can be set based on a variety of factors (number of the COS pods having the first app version container 114, expected production traffic volume expected during the release of the updated version) so that the release may be scheduled during peak or off-peak hours; 3) do not require the same level of human interaction and thus scale well; 4) production traffic can be made not to ping pong between different versions (because there is a point in time when the production traffic 104 is switched (see T2 in FIG. 4), rather than routing production traffic to both versions or a rolling update; 5) allow for the update to be less observable or not observable to customers by avoiding service degradation during the release window; and 6) avoid the disruption of in-flight production traffic and the failure of transactions when the updated version turns out to be unstable during a release. Since releases pose significant risk to a service (See 2.2), the above implementations can scale up efficiently, reduce data center costs, and maintain high trust.

Releases can be conducted at any time and are seamless. Implementations may achieve zero-downtime during releases, even when the current and updated versions use different database schema, by relying on the below discussed time windows to maintain data integrity during the periods of version overlap. Furthermore, in addition to release validation and cut over, the above implementations may perform pre-release database preparation and post-release data maintenance actives in those scenarios where the app must query one or more stateful databases when processing traffic. The reusable deployment pipeline enables the release of updates to applications providing cloud services (performs old app version to new app version transition) with trust using containers to enable anytime seamless releases. Thus, the reusable deployment pipeline reduces the time and expense associated with existing techniques for releasing such updates. In one implementation, this is applied to an existing monolith application by containerizing the monolith application and applying the reusable deployment pipeline.

Additional Detail

Before a time T2, the production traffic 104 is being routed by an application (app) aware proxy 408 (e.g., a Layer 7 (also referred to as an L7 or application layer) proxy, which may be implemented using, for example, the open source Envoy Project) to and from (see line 410) the current version 112 (also referred to as the first application (app) version) that runs in a number of COS pods having first app version containers 414. In some implementations, the app aware proxy 408 includes first app version configuration 409 that causes the production traffic 104 to be routed to the current version 112. The first app version is to be replaced by the orchestrated release of the updated version 132 (also referred to as the second app version) upon pre-release validation of the updated version 132.

In some implementations, the production traffic 104 causes the application (app) to communicate with the set one or more database(s) 450 (one or more of which may be stateful databases) provided through a database management system (DBMS) 452. Prior to time T2, this communication is with the first app version containers 414 as illustrated by line 454. In some such implementations, the DBMS 452 is configured with a database username that is assigned to the first app version (illustrated as first app version DB user name 456) and a database schema (illustrated as first app version schema 458) for accessing data store 460. In some such implementations, a separate database user name (illustrated as the second app version DB user name 462) is assigned (which includes the creating and preloading of a user name if there is not an existing one that can be assigned) to the second app version, and any required database schema for the second app version (illustrated as second app version schema 464) is also preloaded, for the second app version to use to access the data store 460. While some implementations use different database usernames 466 to separate communications from the different app versions, alternative implementations may use another technique (e.g., inclusion of separate identifiers).

Container image(s) 440, including a second app version container image 442, are registered with a container registry 444 to which the COS controller 426 has access. In some implementations, the container image(s) 440 also include an app aware proxy container image 448 which the COS controller 426 uses to bring up a set of one or more COS pods with app aware proxy containers to implement the app aware proxy 408. In alternative implementations, the app aware proxy 408 may be deployed independently of the second app version, as it can operate independent of the app functionality.

The release process is set in motion by the submission by a release manager 420 (which may be a human and/or an external automated process) of configuration information 422 (also referred to as a manifest) to a deliverer 424 (e.g., a software development platform such as GitHub) for delivery to the COS 402, and more specifically for delivery to the COS's controller 426 (also referred to as the controller, the replication controller, the COS controller, and in the case of Kubernetes, the Kubernetes Controller).

Responsive to the configuration information 422, the COS controller is to access the second app version container image 442 through the container registry 444 to bring up (see line 428) COS pods having second app version containers 434. The COS controller 426 is also to send signals (line 428; referred to as readiness requests, or readiness probe requests in Kubernetes) to the COS pods having the second app version containers 434 to determine whether and when it can cause the COS pods having the first app version containers 414 to shut down (see line 490; which may be done by first instructing each to gracefully shutdown and starting a timer, and then forcing a shutdown of the timer is exceeded).

In implementations in which the production traffic 104 causes the application (app) to communicate with the set of one or more database(s) 450, the second app version container image 442 includes code and database release artifacts (e.g., procedural language/structured query language (PL/SQL) Scripts; database query optimization statistics and/or hints; etc.). The code, when executed within the COS pods having the second app version containers 434, causes them to participate in the election of a leader (e.g., using an exclusive semaphore), and the elected leader then prepares the database(s) 450 by loading the database release artifacts using the second app version DB user name 462. In addition, in implementations where the traffic 472 causes the application (app) to communicate with the set of one or more database(s) 450, the second app version containers 434 communicate with the database(s) 450.

Responsive to the configuration information 422, the COS controller 426 is also: 1) to cause (see line 429) the engine 170 to send test and/or warm up traffic 472 (e.g., communicated via the external virtual internet protocol address (VIP) 406 of the COS 402) with an identifier; and 2) to cause the app aware proxy 408 to use that identifier to route the traffic 472 to and from the second app version containers 434 (e.g., see second app version configuration 474) while continuing to route the production traffic 104 to and from the first app version containers 414. In one implementation, responsive to the configuration information 422, the COS controller 426 is also: 1) to cause (see line 429) the engine 170 to determine one or more release time, version specific tests to run to validate the updated version 132 based on the application version identifier assigned to the updated version 132 and version rules 175; 2) to cause the engine 170 to send test and/or warm up traffic 472 (e.g., communicated via the external virtual internet protocol address (VIP) 406 of the COS 402) with an identifier; 3) to cause the app aware proxy 408 to use that identifier to route the traffic 472 to and from the second app version containers 434 (e.g., see second app version configuration 474) while continuing to route the production traffic 104 to and from the first app version containers 414; and 4) to cause the engine 170 to retrieve the failure rules 177 for the failed tests and determines an appropriate action. Thus, in some implementations, the app being upgraded supports: 1) a mechanism to indicate when the new version of the app is live and can receive test traffic (e.g., supports health mediation signals to such as liveness request (also referred to as liveness probe requests in Kubernetes); and 2) a mechanism to determine when the transition to routing the production traffic to the new version has occurred (e.g., the app pinging a URL to learn if it is receiving production traffic).

If and when enough of the COS pods having the second app version containers 434 are live and the second app version has been validated, then the app aware proxy 408 at time T2 is configured to transition the routing of the production traffic 104 to the second app version containers 434 (see line 476). Thus, the production traffic 104 continues to be routed to the current version 112 as the transition to the updated version 132 is in progress. However, if and when it is determined to be safe, the production traffic 104 is switched to the updated version 132. In the situation where the result of the test traffic 472 indicates that the second app version has one or more problems and cannot be validated (e.g., a triggered failure rule indicates that the transition from the current version 112 to the updated version 132 not occur), then the switch is not performed and the production traffic 104 continues to be routed to the current version 112; since the current version 112 is assumed to be stable, there should be no interruption in the handling of the production traffic 104 due to the failure of the second app version to be validated. This is advantageous over conventional systems which switch production traffic over to the updated version without having performed this type of validation because any unexpected errors can result in the interruption of the processing of the production traffic 104. Such an interruption would be visible to customers, and therefore result in a less than optimal customer experience.

In implementations in which the production traffic 104 causes the application (app) to communicate with the set of one or more database(s) 450, after the transition that communication is now between the second app version containers 434 and the database(s) 450 (see line 478).

As previously described, the COS controller 426 is to send signals (line 428) to the COS pods having the second app version containers 434 to determine whether and when it can cause the COS pods having the first app version containers 414 to shut down (line 490). In some implementations, the second app version container image 442 also includes code, that when executed, causes the COS pods having the second app version containers 434 to: 1) determine whether the transition to sending them the production traffic 104 has occurred; and 2) respond affirmatively to readiness requests from the COS controller 426 only after the transition has occurred (see line 428). As compared to conventional systems in which new COS pods would respond to such readiness request irrespective of whether any such validation and transition has occurred, the implementation described herein provides an opportunity for the validation of the updated version 132 to occur by having the COS pods with the second app version containers 434 signal readiness only if and after the validation is successful.

Implementations of the reusable deployment pipeline 480 will now be described. In some implementations, the container image(s) 440 also include a reusable deployment pipeline container image(s) 482 which the COS controller 426 uses to bring up a set of one or more COS pods with reusable deployment pipeline containers to implement the reusable deployment pipeline 480. FIG. 4 also illustrates implementations in which the reusable deployment pipeline 480 is implemented by or replaced with a runlist sequencer 184 (also referred to as a sequencer or release orchestrater) (e.g., implemented with Rundeck or the open source Jenkins Pipeline project, which offers an end-user programmable pipeline specification language and reliable execution capability) and a proxy control plane 486 (e.g., Switchboard, Istio), in which case the container image(s) 440 may include a runlist sequencer container image 485 and a proxy control plane container image 487 which the COS controller 426 may respectively use to bring up a set of one or more COS pods with runlist sequencer containers to implement the runlist sequencer 184 and a set of one or more COS pods with proxy control plane containers to implement the proxy control plane 486. While FIG. 4 illustrates implementations in which the reusable deployment pipeline 480 is implemented by or replaced with a runlist sequencer 184 and a proxy control plane 486, in other implementations the operations attributed to these are integrated into the COS controller 426.

In some implementations, the runlist sequencer container image 485 includes a parameterized pipeline definition 488 that is controlled through a set of one or more parameters provided in the configuration information 422. This allows for a greater level of reusability because one or more of the set of parameters may be changed between updates. Thus, responsive to the configuration information 422, per line 429 the COS controller 426 may also be implemented to determine if there is a reusable deployment pipeline 480 (or runlist sequencer 184) already running that can be used; and if not, to bring one up (e.g., bringing up a COS Pod with a runlist sequencer container based on an identification of a runlist sequencer container image 485 in the configuration information 422). Further, as described in more detail later herein, the COS controller 426 may provide a set of parameters (e.g., including identification information and/or a threshold number) from the configuration information 422 to the reusable deployment pipeline 480 (or the runlist sequencer 184).

In some implementations, the runlist sequencer 184 controls the release steps and the proxy control plane 486 controls the set of one or more app aware proxies 408 to route the test traffic and production traffic to the current version 112 and updated version 132. In one implementation, the proxy control plane 486 and app aware proxy 408 can be implemented as a single device (e.g., a routing engine 191 in FIG. 1). In some implementations, the runlist sequencer 184: 1) either fails or succeeds (error outs or completes within a relatively short time); 2) runs in a singleton container alongside the updated version 132 and is active only during releases; 3) is implemented such that each step in the runlist sequencer 184 is idempotent; and/or 4) performs error handling, logs, release robustness, manageability, security etc.

When the COS pods having the second app version 432 are brought up, a service discovery service 438 (e.g., Endpoint Discovery Service (EDS) in Envoy, Apache ZooKeeper) found in conventional data centers receives from the COS pods having the second app version containers 434 (see line 437) and provides (see line 439) to the reusable deployment pipeline 480 (or the proxy control plane 486): 1) identification information provided through the COS controller 426 receiving the configuration information 422 and bringing up the COS pods having the second app version containers 434; and 2) network information (e.g., IP address(es) and port numbers) for the COS pods having the second app version containers 434. In addition, the service discovery service 438 recognizes when the COS pods having the first app version containers 414 have been shut down (see line 437) and provides notifications of such (see line 439) to the reusable deployment pipeline 480 (or the proxy control plane 486).

The reusable deployment pipeline 480 is to: 1) cause the validation (see line 494) of the updated version 132 using the COS pods having the second app version containers 434 that are live (see line 495) responsive to receiving from the COS controller 426 a set of parameters (see line 429) from the configuration information 422 provided to the COS controller 426; 2) if the second app version is validated, to cause a transition to sending the production traffic 104 to the second app version containers that are Live (traffic management) (see line 496); and 3) optionally cause post-release activities (e.g., database maintenance activities (see line 497) to clean up anything no longer needed since the old app version is no longer being used; sending notifications (see line 498) regarding the status (progress and/or success/failure outcomes) of the update to subscribing services 436 (e.g., to trust and internal monitoring systems, to a reliable system of record for further analysis and corrective action).

As illustrated by line 499, the runlist sequencer 184 (also referred to as a release orchestrator) and the proxy control plane 486 communicate with each other (e.g., the network information for the COS pods having the second app version containers 434, instructions concerning when to change the routing rules that route the test and/or warmup traffic 472 from the engine 170 and the production traffic 104, and a notification of when all of the COS pods having the first app version containers 414 have been shut down). The runlist sequencer 184 is to: 1) monitor the status (see line 495) of the COS pods having the second app version containers 434; 2) instruct (see line 499) the proxy control plane 486 when to change the routing rules (see line 496) in the app aware proxy 408; 3) cause the initiation of and receive the result of (see line 494) the test and/or warmup traffic 472; and 4) optionally cause any post-release activities (see lines 497 and/or 498).

In addition to the above, the proxy control plane 486, only after the transition has occurred, causes the app aware proxy 408 to reply affirmatively to requests (e.g., configure a routing rule) whether the second app version containers 434 are now receiving the production traffic 104. In some implementations, this is done by causing a URL derived from the identification information in the configuration information 422 to affirmatively respond to pings requesting whether the second app version containers 434 are now receiving the production traffic 104 (according to HTTP, 200=yes and 500=no), wherein code in the second app version container image 442, when executed, causes the second app version containers 434 to use the same identification information to derive the same URL and to ping it to determine whether the transition has occurred). In other words, in addition to causing the switching of the production traffic 104 to the updated version 132, around the same time the runlist sequencer 184 also causes the proxy control plane 486 of the app aware proxy 408 to set an indication to indicate that the production traffic 104 is now switched to being sent to the updated version 132; the updated version 132, responsive to this indication, will then respond to readiness requests from the COS controller 426 in the affirmative. This indication mechanism allows for a first window of time within which the test and/or warm up traffic 472 can be sent to the updated version 132 while the production traffic 104 is still being sent to the current version 112. When the updated version 132 signals ready responsive to requests from the COS controller 426, the COS controller 426 starts the process of shutting down the COS pods having the first app version containers 414. As previously described, this shutting down process may include: 1) instructing the COS pods having the first app version containers 414 to gracefully shutdown; and/or 2) using a set of timers to provide a second window of time to allow the COS pods having the first app version containers 414 to have a chance to complete in-flight execution of long running requests and jobs before being forcibly shut down.

Thus, the: 1) the first time window is created to delay the COS controller 426 from starting, responsive to the COS pods having the second app version containers 434 reaching a point when they would be considered ready in a conventional system, the shutdown process of the COS pods having the first app version containers 414 so as to provide time for the test and/or warmup traffic 472 to be routed to the updated version 132 while the production traffic 104 is being routed to the current version 112; and 2) the second time window is created after cutting over the production traffic 104 from the current version 112 to the updated version 132 so as to provide a reasonable amount of time after the cut over for the current version 112 to process the production traffic 104 that was sent to it. Therefore, there is overlapping execution of the current version 112 and the updated version 132 during the first time window (the current version 112 processing the production traffic 104, and the updated version 132 processing the test and/or warmup traffic 472) and the second time window (the current version 112 processing the production traffic 104 sent to it before the cut over, and the updated version 132 processing the production traffic 104 sent it after the cut over).

In some implementations, the app being updated relies on one or more internal services 489 (e.g., a search service, a message queue service, a cache service), and this is addressed by having the first app version containers 414 and the second app version containers 434 communicate separately with these internal services.

Also, in some implementations, a construct (referred to herein as a service(s) collection) is used to create, organize, and monitor a set of one or more service(s) to be provided. FIG. 4 illustrates the option of having multiple service(s) collection by showing service(s) collections 405A-N. A service(s) collection is a collection of pods (e.g., kpods), and possibly multiple microservices (e.g., Kubernetes services), that each provide one or more service(s). A service(s) collection is a collection in that it: 1) provides multiple instances of the same service and/or microservice through different COS pods; and/or 2) provides different types of services and/or microservices through different COS pods. In some such implementations, the release of the updated version 132 is separately controlled for each such service(s) collection. For example, implementations may support the release of separate configuration information 422 for each service(s) collection 405 by including a service(s) collection ID assigned to each such service(s) collection 405. Additionally or alternatively, implementations may support multiple COSs 402 in different data centers in different geographic locations, and each of the COS controllers 426 of these COSs 402 may: 1) track the service(s) collections IDs of the service(s) collection they are hosting; and 2) receive a broadcasting of the configuration information 422 for each update to each of the service(s) collection, and decide whether to act on each respective configuration information 422 based on whether the service(s) collection ID in that respective configuration information 422 is one assigned to one of the collection(s) services being hosted by that COS 402. Additionally, or alternatively, different customers (or groups of customers) may be assigned to different (possibly identical) service(s) collections 405.

By way of example, assume that the app being updated provides a customer relationship management (CRM) service (e.g., Sales Cloud by salesforce.com, Inc.), which relies on internal services 489 (e.g., helper microservices that provide a search service, a cache service, and a message queue (MQ) service) and interacts with the database(s) 450. Also, assume that there may be multiple ones of the service(s) collections 405 that: 1) each include first app version containers, the internal services 489, and the DBMS 452; and 2) provide the CRM service to different customers or groups of customers. For each such service(s) collection, the release manager 420 may submit the configuration information 422 so that the system 400 and/or reusable deployment pipeline 480 attempts to transition that service(s) collection to an updated version of the app (switches to using second app version containers brought up within that service(s) collection). This contrasts with such a CRM service being provided by a self-contained unit (referred to as a Salesforce Point of Deployment (sfPOD) or Salesforce Instance) having all the software and hardware needed to provide the service (e.g., all the application server(s), database server(s), storage, search service etc. and hardware executing them). Thus, while historically the concept of an sfPOD is sometimes thought of as designating physically collocated hardware, each of the service(s) collection 405 can be thought of as a logical sfPOD (also referred to as a logical Salesforce Instance) because the COS 402 is orchestrating the: 1) nodes (also referred to herein as COS nodes), where a node is a representation of a single machine in a COS cluster, where that single machine can be a physical machine in a datacenter or virtual machine hosted on a cloud provider: 2) clusters (also referred to herein as COS clusters 403), where a cluster represents a more powerful machine resulting from pooling the resources (CPUs and RAM) of the nodes within the cluster; and 3) persistent volumes (a persistent volume is a file system that can be mounted to the cluster, without being associated with any particular node; while traditional local storage associated to each node is treated as a temporary cache to hold programs and data).

Figure 5A:
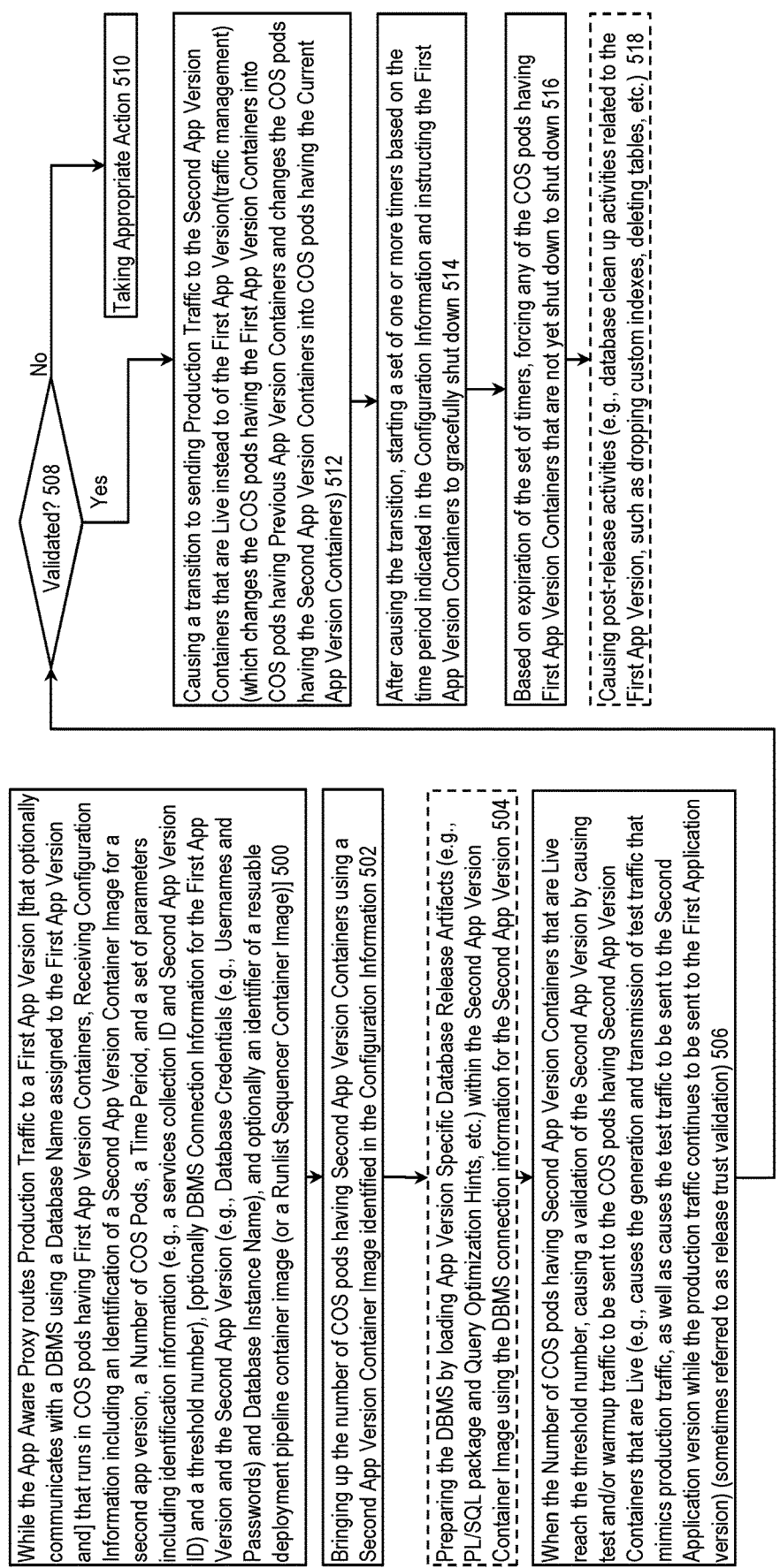
FIG. 5A is a flow diagram illustrating a method for a system for release orchestration according to some example implementations.

FIG. 5A is a flow diagram illustrating a method for a system for release orchestration according to some example implementations. While an app aware proxy routes production traffic to a first application (app) version that runs in a plurality of container orchestration system (COS) pods having first app version containers, receiving in block 500 configuration information including an identification of a second app version container image for a second app version, a number of COS pods, a time period, and a set of parameters including identification information and a threshold number. The second app version is an updated version of the first app version. From block 500, control passes to block 502.

Block 502 shows, using the second app version container image identified in the configuration information, the bringing up of COS pods having second app version containers until their number meets the number of COS pods from the configuration information. From block 502, control passes to block 504.

If the first application (app) version is to communicate (query) with a database management system (DBMS) using a database name assigned to the first app version, then: 1) the configuration information includes DBMS connection information for the first app version and the second app version; and 5) optional block 504 shows the preparing of the DBMS by loading app version specific database release artifacts within the second app version container image using the DBMS connection information for the second app version. In some implementations, the DBMS connection information for the second app version was previously preloaded into the DBMS, and the second app version container image was previously registered with the container registry. In some implementations, the DBMS connection information for the first app version and the second app version each include database credentials, which include: 1) database usernames and passwords; and 5) optionally a database instance name. In some implementations, the app version specific database release artifacts include a PL/SQL package and a set or one or more query optimization hints. From block 504, control passes to block 506.

Block 506 shows that when the threshold number of the COS pods having the second app version containers are live, the causing of a validation of the second app version by causing test and/or warmup traffic to be sent to the COS pods having the second app version containers that are live. In some implementations, this includes causing: 1) the generation and transmission of test traffic that mimics production traffic; and 2) the test traffic to be sent to the second application version while the production traffic continues to be sent to the first application version. In other implementations, this further includes causing: 1) the selection of one or more tests based on an application version identifier of the second app version and version rules prior to generating the test traffic. From block 506, control passes to block 508.

In block 508, it is determined whether the result of the test and/or warmup traffic indicates that the second app version has been validated. If not, control passes to block 510 where appropriate action is taken (e.g., terminating the release of the update and any notifying subscribing services of the failure). Otherwise, control passes to block 512.

Block 512 shows the causing of a transition to sending production traffic to the second app version containers that are live instead of to the first app version. From block 512, control passes to block 514.

Block 514 shows that the method then starts a set of one or more timers based on the time period indicated in the configuration information and instructs the first app version containers to gracefully shut down. From block 514, control passes to block 516. The first app version containers shut down when there is no more work to do (they shut themselves down) or the configured timeout is exceeded. We may configure this timeout in some implementations to be relatively long so that relatively long running work may be completed.

In block 516, if based on expiration of the set of timers, any of the COS pods having the first app version containers that are not yet shut down are forced to shut down. From block 516, control passes to block 518.

Optional block 518 shows the method causing a set of post-release activities (e.g., database cleanup activities related to the first app version, such as dropping custom indexes, deleting tables, etc.).

Figure 5B:
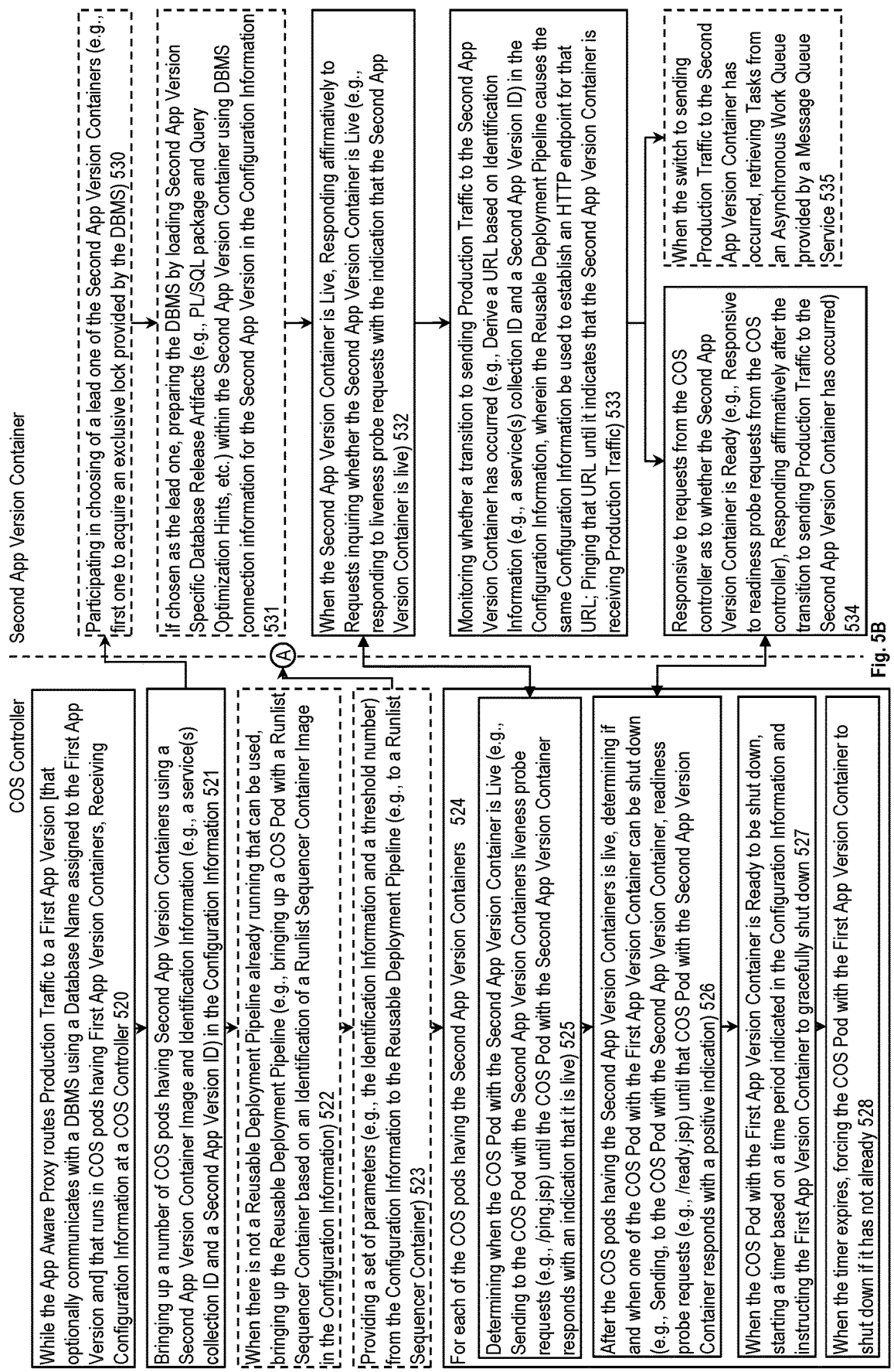
FIG. 5B is a flow diagram illustrating a method for a COS controller and second app version containers according to some example implementations.

FIG. 5B is a flow diagram illustrating a method for a COS controller and second app version containers according to some example implementations. In block 520, while an app aware proxy routes production traffic to a first application (app) version that runs in a plurality of container orchestration system (COS) pods having first app version containers, the COS controller receives configuration information. From block 520, control passes to block 521.

Block 521 shows the COS controller bringing up a number of COS pods having second app version containers using a second app version container image and identification information in the configuration information. In some implementations, the second app version container image was previously registered with the container registry. From block 521, control passes to block 522 and 530.

Optional block 522 shows that when there is not a reusable deployment pipeline already running that can be used, the COS controller brings up a reusable deployment pipeline. In some implementations, this includes the COS controller bringing up a COS pod with a runlist sequencer container based on a runlist sequencer container image identified in the configuration information. From block 522, control passes to block 523.

Optional block 523 shows the COS controller providing a set of parameters from the configuration information to a reusable deployment pipeline. As previously described, the reusable deployment pipeline is responsible for causing a transition to sending production traffic to the second app version containers instead of the first app version after the second app version containers have been validated. From block 523, control passes to circled A and block 524.

Block 524 illustrates that the COS controller performs blocks 525, 526, 527, and 528 for each of the COS pods having the second app version containers.

In block 525, the COS controller, when the second app version container is live, responds affirmatively to requests from the COS controller determines when the COS pod with the second app version Container is live. In some implementations, this is performed by the COS controller sending to the COS pod with the second app version container liveness requests until the COS pod with the second app version container responds with an indication that it is live. From block 525, control passes to block 526.

Block 526 shows that after the COS pod having the second app version container is live, determining if and when one of the COS pods with the first app version container can be shut down. In some implementations, this is performed by the COS controller sending to the COS pod with the second app version container readiness requests until a positive indication is returned. From block 526, control passes to block 527.

In block 527, when the COS pod with the first app version container is ready to be shut down, the COS controller starts a timer based on a time period indicated in the configuration information and instructs the first app version container to gracefully shut down. From block 527, control passes to block 528.

In block 528, the COS controller, when the timer expires, forces the COS pod with the first app version container to shut down if it has not already.

If the first application (app) version communicates with a database management system (DBMS), then optional blocks 530 and 531 are performed. Otherwise, control passes from block 521 to block 532.

In optional block 530, each of the second app version containers participates in choosing of a lead one of the second app version containers. From block 530, control passes to block 531.

Optional block 531 shows that the lead one of the second app version containers prepares the DBMS by loading second app version specific database release artifacts within the second app version container using the DBMS connection information for the second app version in the configuration information. In some implementations, the DBMS connection information for the second app version was previously preloaded into the DBMS. In some implementations, the DBMS connection information for the first app version and the second app version each include database credentials, which include: 1) database usernames and passwords; and 5) optionally a database instance name. In some implementations, the app version specific database release artifacts include a PL/SQL package and a set of one or more query optimization hints. From block 531, control passes to block 532.

Block 532 shows that each of the second app version containers, when it is live, responds affirmatively to requests inquiring whether the second app version container is live. Thus, in some implementations block 525 and block 532 illustrate control signals between the COS controller and the second app version containers. From block 532, control passes to block 533.

In block 533, each of the second app version containers monitors whether the transition to sending production traffic to the second app version container has occurred. In some implementations, this is performed: 1) deriving a URL based on the identification information (e.g., a services collection identifier and/or a second app version identifier) in the configuration information; and 5) pinging that URL until it indicates that the second app version container is receiving production traffic. Once it has, control passes to block 534 and block 535.

Block 534 shows that responsive to requests from the COS controller as to whether the second app version container is ready, the second app version container responds affirmatively after determining that the transition to sending production traffic to the second app version container has occurred. Thus, in some implementations block 526 and block 534 illustrate control signals between the COS controller and the second app version containers.

Optional block 535 shows that each of the second app version containers, after determining that the switch to sending production traffic to the second app version has occurred, starts retrieving tasks from an asynchronous work queue provided by a message queue service.

Figure 5C:
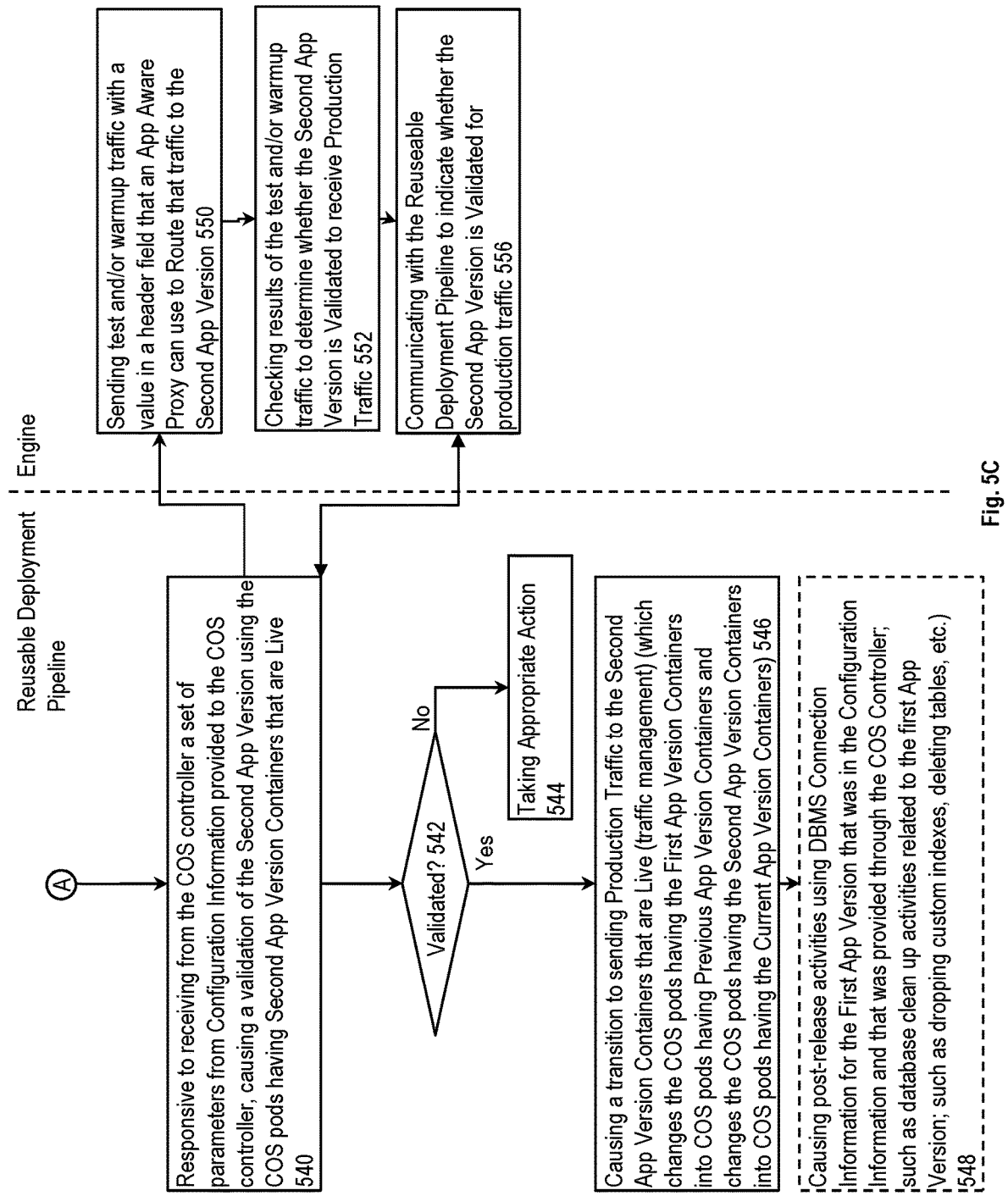
FIG. 5C is a flow diagram illustrating a method for a reusable deployment pipeline and an engine according to some example implementations.

FIG. 5C is a flow diagram illustrating a method for a reusable deployment pipeline and an engine according to some example implementations. Block 540 shows that, responsive to receiving from a COS controller a set of parameters from configuration information provided to the COS controller while an app aware proxy routes production traffic to a first application (app) version and that runs in container orchestration system (COS) pods having first app version containers, the reusable deployment pipeline causes a validation of a second app version using COS pods having second app version containers that are now live after having been brought up by the COS controller responsive to the provision of the configuration information. The configuration information having been provided to cause a transition to the second app version which is an update to the first app version. From block 540, control passes to block 542 and 550.

In block 542, it is determined whether the second app version has been validated. If not, control passes to block 544 where appropriate action is taken (e.g., terminating the release of the update and any notifying subscribing services of the failure). Otherwise, control passes to block 546.

Block 546 shows that after the validation, the reusable deployment pipeline causes the transition to sending production traffic to the second app version containers that are determined to be live instead of to the first app version containers. From block 546, control passes to block 548.

In optional block 548, the reusable deployment pipeline causes post-release activities using DBMS connection information for the first app version that was in the configuration information and that was provided through the COS controller.

In block 550, the engine sends test and/or warmup traffic with a value in a header field that an app aware proxy can use to route that traffic to the second app version. Thus, in some implementations block 540 and block 550 illustrate control signals between the reusable deployment pipeline and the engine. From block 550, control passes to block 552.

Block 552 shows that the engine checks the result of the test and/or warmup traffic to determine whether the second app version is validated to receive production traffic. From block 552, control passes to block 556.

In block 556, the engine communicates with the reusable deployment pipeline to indicate whether the second app version is validated for production traffic.

Figure 5D:
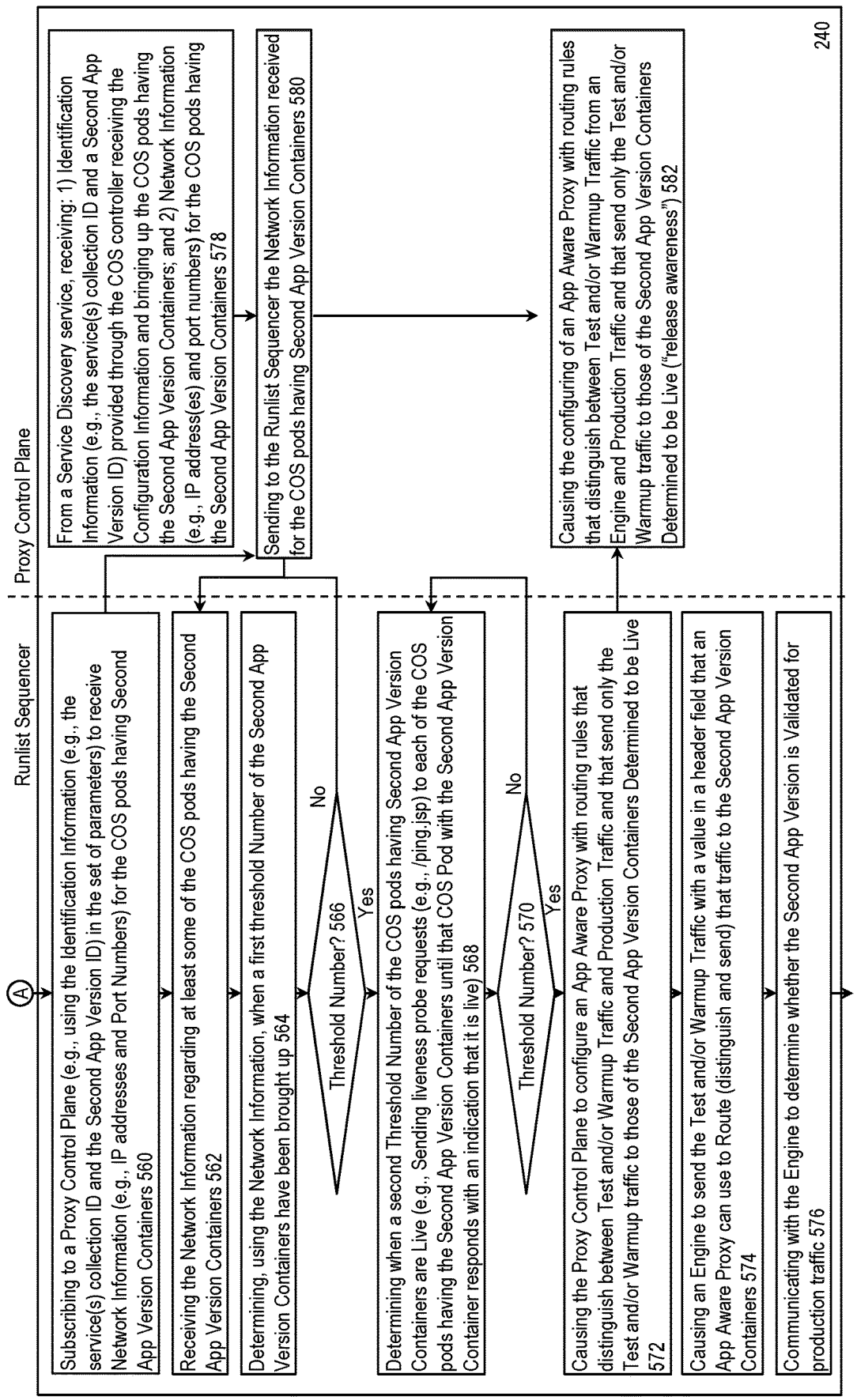
FIG. 5D is a flow diagram illustrating a first part of a method for a runlist sequencer and a proxy control plane according to some example implementations.

FIG. 5D is a flow diagram illustrating a first part of a method for a runlist sequencer and a proxy control plane according to some example implementations. FIG. 5D shows an exploded version of block 540 according to some implementations.

In block 560, the runlist sequencer subscribes, using identification information in the set of parameters, to a proxy control plane to receive network information for the COS pods having the second app version containers. From block 560, control passes to block 562 and 580.

In block 562, the runlist sequencer receives from the proxy control plane the network information regarding at least some of the COS pods having the second app version containers. From block 562, control passes to block 564.

In block 564, the runlist sequencer determines, using the network information, when a first threshold number of the COS pods having the second app version containers have been brought up by the COS controller. From block 564, control passes to block 566.

In block 566, it is determined whether the first threshold number has been met. If not, control passes back to block 562. Otherwise, control passes to block 568.

In block 568, the runlist sequencer determines when a second threshold number (which may be the same or different than the first threshold number) of the COS pods having the second app version containers are live. In some implementations, this includes sending liveness requests to each of the COS pods having the second app version containers until that COS pod with the second app version container responds with an indication that it is live. From block 568, control passes to block 570.

In block 570, it is determined whether the second threshold number has been met. If not, control passes back to block 568. Otherwise, control passes to block 572.

In block 572, the runlist sequencer causes the proxy control plane to configure the app aware proxy with routing rules that distinguish between test traffic and production traffic and that send only the test traffic to those of the second app version containers determined to be live. From block 572, control passes to block 574 and to block 582.

In block 574, the runlist sequencer causes the engine to send the test and/or warmup traffic with a value in a header field that the app aware proxy can use to route that traffic to the second app version containers that are live. From block 574, control passes to block 576.

In block 576, the runlist sequencer communicates with the engine to determine whether the second app version is validated for production traffic. From block 576, control passes to block 542.

In block 578, the proxy control pane receives from a service discovery service both: 1) the identification information provided through the COS controller receiving the configuration information and bringing up the COS pods having the second app version containers; and 5) the network information for the COS pods having the second app version containers. In some implementations, the network information includes internet protocol (IP) addresses and port numbers for the second app version containers. From block 578, control passes to block 580.

In block 580, the proxy control pane sends to the runlist sequencer the network information for the COS pods having the second app version containers. From block 580, control passes to block 582.

In block 582, the proxy control pane causes the configuring of the app aware proxy with routing rules that distinguish between test and/or warmup traffic and production traffic and that send only the test and/or warmup traffic to those of the second app version containers determined to be live. This is sometimes referred to as "release awareness."

Figure 5E:
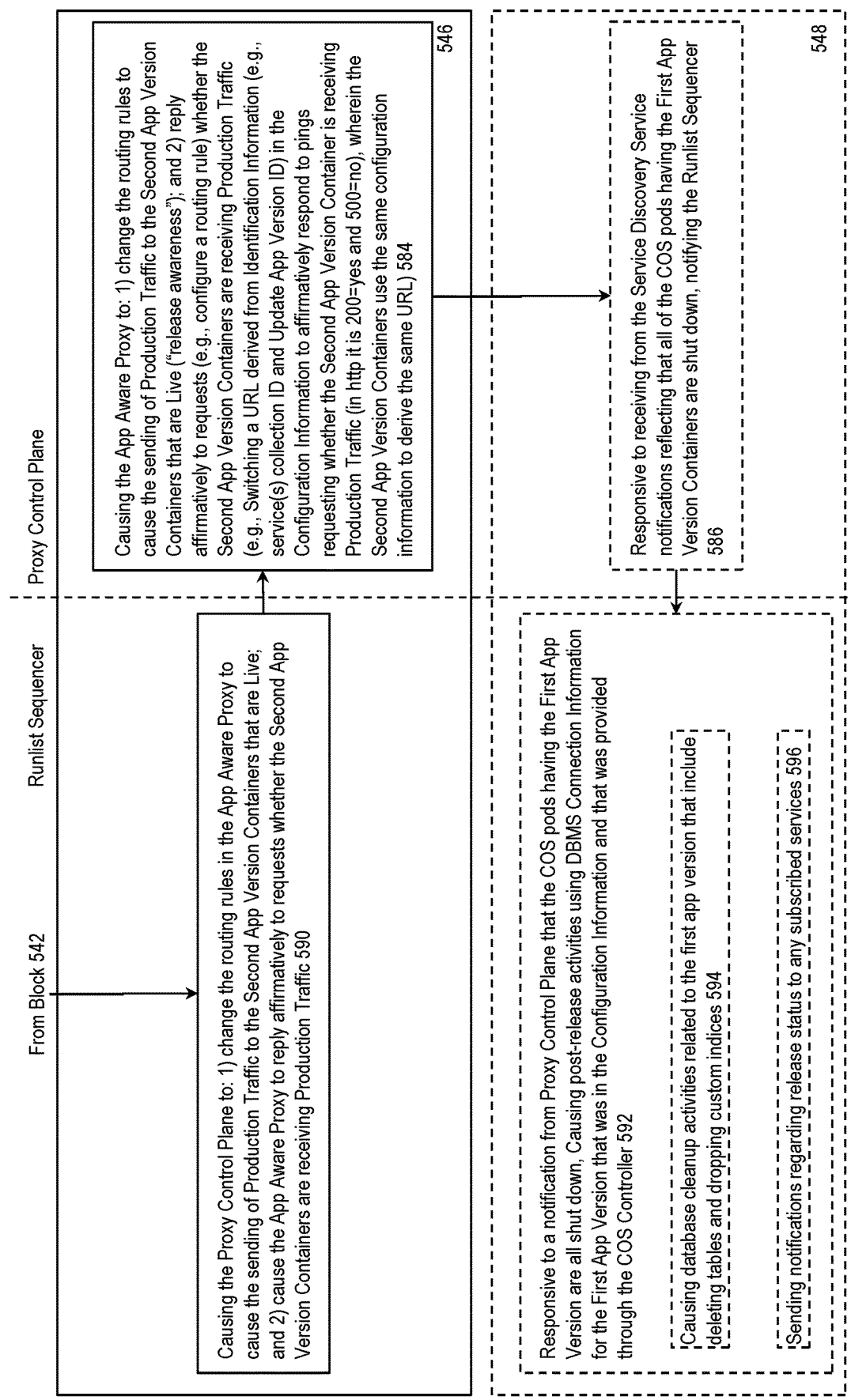
FIG. 5E is a flow diagram illustrating a second part of a method for a runlist sequencer and a proxy control plane according to some example implementations.

FIG. 5E is a flow diagram illustrating a second part of a method for a runlist sequencer and a proxy control plane according to some example implementations. FIG. 5E shows an exploded version of block 546 and block 548 according to some implementations.

Block 542 includes blocks 590 and 584. In block 590, the runlist sequencer causes the proxy control plane to: 1) change the routing rules in the app aware proxy to cause the sending of production traffic to the COS pods having the second app version containers that are live; and 5) cause the app aware proxy to reply affirmatively to requests whether the second app version containers are receiving production traffic. From block 590, control passes to block 584.

In block 584, the proxy control plane causes the app aware proxy to: 1) change the routing rules to cause the sending of production traffic to the COS pods having the second app version containers that are live; and 5) reply affirmatively to requests whether the second app version containers are receiving production traffic. In some implementations, this latter operation is performed by switching an HTTPS endpoint with a URL derived from identification information (e.g., service(s) collection ID and/or Update App Version ID) in the configuration information to affirmatively respond to pings requesting whether the second app version containers are receiving production traffic (in HTTP, 500=yes and 500=no); and the second app version containers use the same configuration information to derive the same URL and ping that HTTPS endpoint). From block 584, control passes to optional block 548 (and more specifically, to optional block 586 within block 548).

In block 586, the proxy control plane, responsive to receiving from the service discovery service notifications reflecting that all the COS pods having the first app version containers are shut down, notifies the runlist sequencer. From block 584, control passes to optional block 592 within block 548.

In block 592, responsive to a notification from proxy control plane that the COS pods having the first app version are all shut down, the runlist sequencer causes post-release activities using DBMS Connection Information for the first app version that was in the configuration information and that was provided through the COS Controller. By way of examples, block 592 may include: 1) causing database cleanup activities (e.g., by triggering a maintenance script in an engine) related to the first app version, such as deleting tables and dropping custom indices (block 594); and 5) sending notifications regarding the status of the release to any subscribed services (block 596).

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. Non-transitory machine-readable storage media that provides instructions that, when executed by a machine, will cause said machine to perform operations comprising:
    responsive to receiving instructions from a release orchestrator to validate a second application (app) version prior to a transition to sending production traffic to the second app version instead of a first app version, determining an app version identifier assigned to the second app version, wherein the first app version and the second app version are each assigned a different one of a plurality of application version identifiers;
    selecting a subset of tests from a plurality of release time, version specific tests based on the app version identifier and a plurality of version rules, wherein the plurality of version rules identify which ones of the plurality of release time, version specific tests to apply based on different ones of the plurality of application version identifiers;
    performing the subset of tests by sending test traffic to the second app version via a routing engine while the routing engine routes the production traffic to the first app version;
    receiving responses to the test traffic from the second app version;
    determining from the responses whether at least one of the subset of tests failed;
    responsive to determining from the responses that at least one of the subset of tests failed:
        determining, based on failure rules, whether any of the subset of tests that failed were configured to indicate that on a failure the transition should not occur, wherein failure rules indicate which of the plurality of release time, version specific tests are configured to indicate that on failure the transition should not occur, and
        responsive to determining that any of the subset of tests that failed were configured to indicate that on failure the transition should not occur,
    communicating to the release orchestrator that the second app version is not validated for the production traffic and the transition to sending the production traffic to the second app version instead of the first app version should not occur; and
    responsive to determining from the responses that none of the subset of tests failed or responsive to determining that none of the subset of tests that failed were configured to indicate that on failure the transition should not occur, communicating to the release orchestrator that the second app version is validated for the production traffic and the transition to sending the production traffic to the second app version instead of the first app version should occur.

2. The non-transitory machine-readable storage media of claim 1, wherein the performing the subset of tests includes: generating the test traffic to include an indicator that the routing engine will use to distinguish the test traffic from the production traffic so it may direct the test traffic to the second app version.

3. The non-transitory machine-readable storage media of claim 1, wherein the determining the app version identifier assigned to the second app version comprises:
    extracting the app version identifier assigned to the second app version from the instructions received from the release orchestrator.

4. The non-transitory machine-readable storage media of claim 1, wherein the determining the app version identifier assigned to the second app version comprises:
    generating a Hypertext Transfer Protocol Secure (HTTPS) request directed to an HTTPS endpoint generated by the second app version;
    sending the HTTPS request to the second app version via the routing engine; and
    receiving an HTTPS response from the second app version via the routing engine, wherein the HTTPS response includes the app version identifier.

5. The non-transitory machine-readable storage media of claim 1, wherein the communicating to the release orchestrator that the second app version is not validated for the production traffic and the transition to sending the production traffic to the second app version instead of the first app version should not occur comprises:
    generating instructions indicating that the transition to sending the production traffic to the second app version instead of the first app version should not occur; and
    storing the instructions in a test results log accessible by the release orchestrator.

6. The non-transitory machine-readable storage media of claim 1, wherein the performing the subset of tests includes generating the test traffic to mimic the production traffic.

7. The non-transitory machine-readable storage media of claim 1, wherein the second app version is an updated version of the first app version.

8. The non-transitory machine-readable storage media of claim 1, wherein the first app version runs in a first plurality of container orchestration system (COS) pods having first app version containers, and wherein the second app version is brought up by a COS controller in a second plurality of COS pods having second app version containers.

9. The non-transitory machine-readable storage media of claim 1, wherein there is a minimum version identifier, a maximum version identifier, and a test application indicator for each of the plurality of release time, version specific tests, and wherein the selecting the subset of tests from the plurality of release time, version specific tests further includes:
    identifying the subset of tests from the plurality of release time, version specific tests for which the app version identifier of the second app version satisfies a requirement identified by the test application indicator based on at least one selected from the group of the minimum version identifier and and/or the maximum version identifier; and
    loading the identified subset of tests.

10. The non-transitory machine-readable storage media of claim 1, wherein the determining from the responses whether at least one of the subset of tests failed further includes:
    determining, for each test of the at least one of the subsets of tests that failed, whether the test is assigned a failure rule indicating to report the failure only or to report the failure and that the transition should not occur.

11. A computer-implemented method comprising:
- responsive to receiving instructions from a release orchestrator to validate a second application (app) version prior to a transition to sending production traffic to the second app version instead of a first app version, determining an app version identifier assigned to the second app version, wherein the first app version and the second app version are each assigned a different one of a plurality of application version identifiers;
- selecting a subset of tests from a plurality of release time, version specific tests based on the app version identifier and a plurality of version rules, wherein the plurality of version rules identify which ones of the plurality of release time, version specific tests to apply based on different ones of the plurality of application version identifiers;
- performing the subset of tests by sending test traffic to the second app version via a routing engine while the routing engine routes the production traffic to the first app version;
- receiving responses to the test traffic from the second app version;
- determining from the responses that at least one of the subset of tests failed;
- determining, based on failure rules, that any of the subset of tests that failed were configured to indicate that on a failure the transition should not occur, wherein failure rules indicate which of the plurality of release time, version specific tests are configured to indicate that on failure the transition should not occur; and
- responsive to determining that at least one of the subset of tests that failed was configured to indicate that on failure the transition should not occur, communicating to the release orchestrator that the second app version is not validated for the production traffic and the transition to sending the production traffic to the second app version instead of the first app version should not occur.

12. The method of claim 11, wherein the performing the subset of tests includes:
- generating the test traffic to include an indicator that the routing engine will use to distinguish the test traffic from the production traffic so it may direct the test traffic to the second app version.

13. The method of claim 11, wherein the determining the app version identifier assigned to the second app version comprises:
- extracting the app version identifier assigned to the second app version from the instructions received from the release orchestrator.

14. The method of claim 11, wherein the determining the app version identifier assigned to the second app version comprises:
- generating a Hypertext Transfer Protocol Secure (HTTPS) request directed to an HTTPS endpoint generated by the second app version;
- sending the HTTPS request to the second app version via the routing engine; and
- receiving an HTTPS response from the second app version via the routing engine, wherein the HTTPS response includes the app version identifier.

15. The method of claim 11, wherein the communicating to the release orchestrator that the second app version is not validated for the production traffic and the transition to sending the production traffic to the second app version instead of the first app version should not occur comprises:
- generating instructions indicating that the transition to sending the production traffic to the second app version instead of the first app version should not occur; and
- storing the instructions in a test results log accessible by the release orchestrator.

16. The method of claim 11, wherein the performing the subset of tests includes generating the test traffic to mimic the production traffic.

17. The method of claim 11, wherein the second app version is an updated version of the first app version.

18. The method of claim 11, wherein the first app version runs in a first plurality of container orchestration system (COS) pods having first app version containers, and wherein the second app version is brought up by a COS controller in a second plurality of COS pods having second app version containers.

19. The method of claim 11, wherein there is a minimum version identifier, a maximum version identifier, and a test application indicator for each of the plurality of release time, version specific tests, and wherein the selecting the subset of tests from the plurality of release time, version specific tests further includes:
- identifying the subset of tests from the plurality of release time, version specific tests for which the app version identifier of the second app version satisfies a requirement identified by the test application indicator based on at least one selected from the group of the minimum version identifier and the maximum version identifier; and
- loading the identified subset of tests.

20. The method of claim 11, wherein the determining from the responses that at least one of the subset of tests failed further includes:
- determining for at least one of the subsets of tests that failed, that the at least one of the subsets of tests that failed is assigned a failure rule indicating to report the failure and that the transition should not occur.

* * * * *